US012767495B2

(12) United States Patent
Auffart

(10) Patent No.: US 12,767,495 B2
(45) Date of Patent: Oct. 20, 2026

(54) WIND TURBINE LIFTING RIG

(71) Applicant: Brian Auffart, Georgetown, IN (US)

(72) Inventor: Brian Auffart, Georgetown, IN (US)

( * ) Notice: Subject to any disclaimer, the term of this patent is extended or adjusted under 35 U.S.C. 154(b) by 137 days.

(21) Appl. No.: 18/753,134

(22) Filed: Jun. 25, 2024

(65) Prior Publication Data

US 2025/0003390 A1 Jan. 2, 2025

Related U.S. Application Data

(60) Provisional application No. 63/510,967, filed on Jun. 29, 2023.

(51) Int. Cl.

*B66C 23/20* (2006.01)
*F03D 13/10* (2016.01)
*B66C 23/18* (2006.01)

(52) U.S. Cl.

CPC .......... *B66C 23/207* (2013.01); *F03D 13/139* (2023.08); *B66C 23/185* (2013.01); *F05B 2230/61* (2013.01)

(58) Field of Classification Search

CPC ... B66C 23/207; B66C 23/185; F03D 13/139; F05B 2230/61

See application file for complete search history.

(56) References Cited

U.S. PATENT DOCUMENTS

2003/0161708 A1* 8/2003 Johnston ............... B66C 19/005 414/460
2007/0151194 A1* 7/2007 Livingston ............ B66C 23/207 52/651.05
2008/0078128 A1 4/2008 Livingston et al.
2018/0155160 A1* 6/2018 Nelson .................. B66C 23/207
2019/0301431 A1* 10/2019 Üyünük ................ B62B 5/0086

FOREIGN PATENT DOCUMENTS

CN 203529795 U * 4/2014
CN 104370220 A * 2/2015 ........... B66C 23/207
EP 3909904 A1 * 11/2021 ........... E04H 12/342
JP H1182285 A * 3/1999 ........... B66C 23/207
WO WO-9721621 A1 * 6/1997 ............. F03D 13/10

* cited by examiner

*Primary Examiner* — Victoria P Augustine
*Assistant Examiner* — Nathaniel L Adams
(74) *Attorney, Agent, or Firm* — Woodard, Emhardt, Henry, Reeves & Wagner, LLP

(57) ABSTRACT

The present disclosure provides a system for lifting and mounting components of a wind turbine assembly to the top of a wind turbine tower without the requirement of a large crane to reach the top of the tower. The system comprising: an adjustable frame defining an interior space sized to receive the tower, wherein the adjustable frame comprises one or more actuators configured to reduce or expand the interior space defined by the adjustable frame; a first boom attached to the adjustable frame, the first boom rotatable with a first boom actuator; and a second boom attached to the adjustable frame, the second boom rotatable with a second boom actuator, and wherein the first boom and the second boom are joined by a telescoping crossmember.

19 Claims, 23 Drawing Sheets

WIND TURBINE LIFTING RIG

BACKGROUND

The present disclosure relates generally to the field wind turbine construction. As further background, the wind energy industry has matured to the present date to where, in high wind resource regions of the country, it is competitive with even the most efficient and low-cost fossil fuel based electrical generation. However, the most efficient wind turbine systems currently are typically 3 MW turbines on 90 to 100-meter steel tubular towers. The diameter of the steel tower is limited by transportation restraints. Primary among these is the practical need to pass under highway bridges and other infrastructure. In moderate wind resource regions of the country taller towers and larger turbines and longer rotor blades provide access to stronger and more consistent wind and make wind energy more competitive. However, for such tall towers, larger diameter towers are also required and for the reasons outlined above, steel towers are not competitive at 120 m to 160 m hub heights and higher.

Precast concrete towers are an alternative to steel tubular towers and are common in other parts of the world. However, labor costs, shipping distances, weight and number of loads, and the need for an extremely large crane to assemble them makes precast concrete towers less competitive in the United States.

As high wind resource areas of the country are beginning to be built out and long-distance high voltage transmission lines economically impractical, a need exists for taller towers and larger rotor diameters in moderate wind resource areas. The present disclosure provides devices and methods which allow wind energy to become economically competitive in vast new regions of the country.

There remain needs for improved or alternative devices and methods for the construction of wind turbine. Aspects of the present disclosure are addressed to these needs.

SUMMARY

In some aspects, provided are devices and systems useful for constructing a wind turbine. In accordance with some forms of the disclosure, such devices comprise an adjustable frame. Accordingly, in one embodiment the present disclosure provides a system for lifting and mounting components of a wind turbine assembly to the top of a wind turbine tower. In certain embodiments, the system comprises an adjustable frame defining an interior space sized to receive the tower, wherein the adjustable frame comprises one or more actuators configured to reduce or expand the interior space defined by the adjustable frame. In some forms, a first boom is attached to the adjustable frame, the first boom rotatable with a first boom actuator, and a second boom attached to the adjustable frame, the second boom rotatable with a second boom actuator. In accordance with some forms, the first boom and the second boom are joined by a telescoping crossmember.

In certain embodiments, the adjustable frame comprises a four-sided frame body, optionally comprising an actuator positioned on each of the four sides and configured to expand or contract the length of the side. In accordance with some forms, the actuator(s) comprise(s) hydraulic cylinder (s). In certain modes the first boom is parallel to the second boom. Certain embodiments comprise one or more attachment brackets positioned near the top of the tower, wherein the attachment brackets are configured to secure the adjustable frame in position near the top of the tower. In accordance with some forms, the adjustable frame may comprise one or more bracing members extending from a bottom side of the adjustable frame. In certain embodiments the bracing members are configured to attach to a lower set of attachment brackets. Certain embodiments include a lifting hoist and a lifting hoist cable configured to lift and/or lower the adjustable frame on the tower. In some forms, the lifting hoist is positioned within the base of the tower. The lifting hoist may comprise a 4-drum lifting hoist. In accordance with certain embodiments, the system comprises one or more lifting hoist sheaves mounted in the wall of near the top of the tower, and optionally the lifting hoist cable extends from the lifting hoist, through a lifting hoist sheave, and is secured to the adjustable frame.

Still further embodiments, as well as features and advantages of embodiments described herein, will be apparent to persons skilled in the relevant field from the descriptions herein.

DETAILED DESCRIPTION

Figure 1:
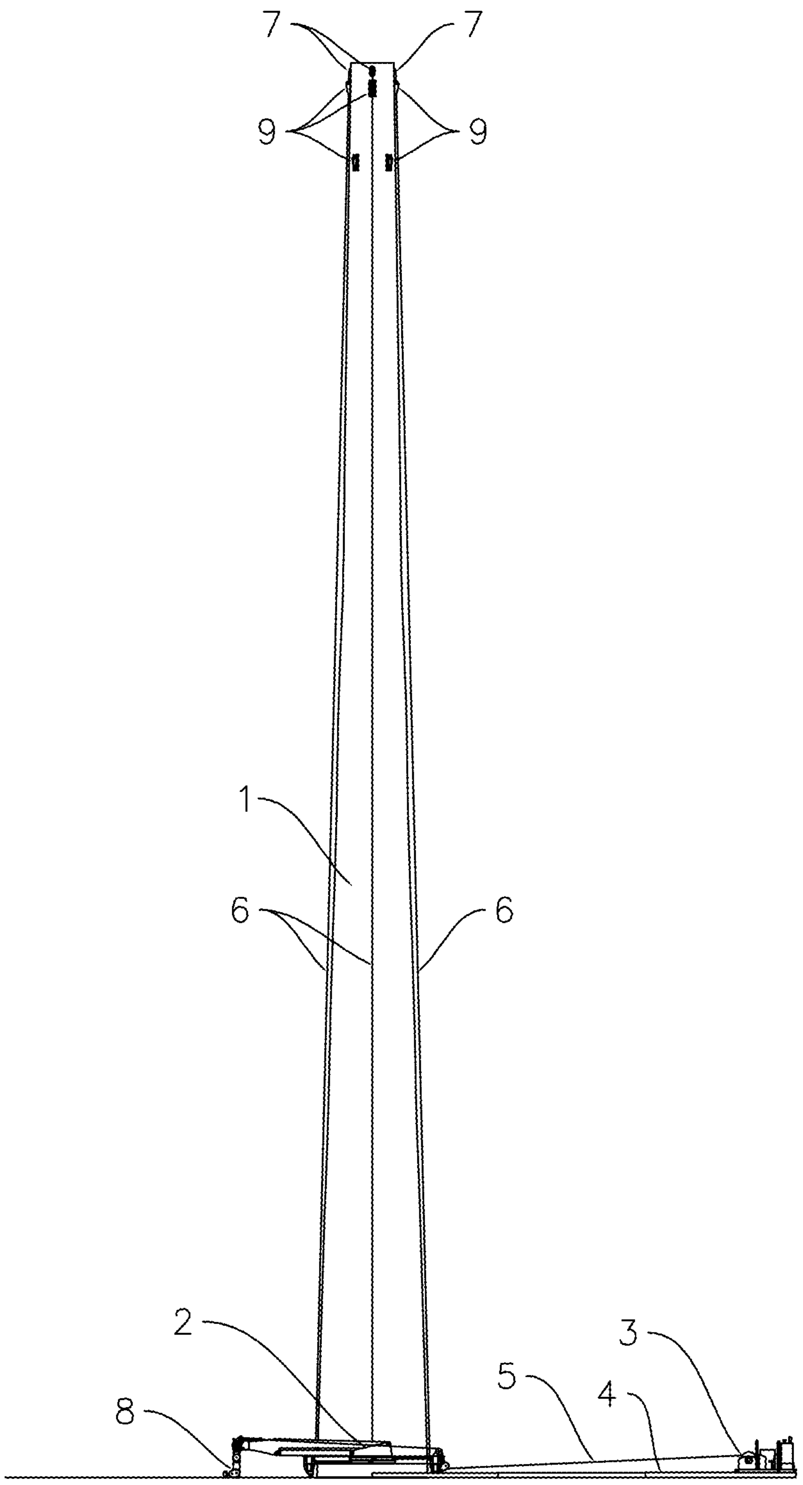
FIG. 1 provides a side view of one embodiment of a wind turbine lifting device of the present disclosure.

Reference will now be made to certain embodiments, some of which are illustrated in the drawings, and specific language will be used to describe the same. It will nevertheless be understood that no limitation of the scope of the disclosure is thereby intended. Any alterations and further modifications in the described embodiments and any further applications of the principles as described herein are contemplated as would normally occur to one skilled in the art to which this disclosure relates.

As disclosed above, aspects of the present disclosure relate to wind turbines, in particular devices and methods useful in the construction of wind turbines. In certain embodiments, the present disclosure relates to a device or rig useful for lifting and mounting the components of a wind turbine to the top of a wind turbine tower. Such wind turbine components may comprise a wind turbine nacelle assembly, a rotor assembly, adapter, and/or individual turbine blades. In accordance with some forms, the device and methods provided herein allow for such lifting and mounting without the use of a large crane. In this way, the present disclosure provides a system and methods which may be used to construct large wind turbines. Towers with a height of over 200 m with 4MW turbines are feasible.

An alternative to construction techniques requiring large cranes, various approaches have been developed which involve onsite casting techniques. For example., certain techniques utilize a self-climbing formwork, such as slip-form methods, for casting concrete to form wind turbine towers. Using self-climbing jump-form construction methods, a cast in place tapered concrete tower can be constructed without the use of an extremely large crane for less cost than slip-form construction or tall steel tower construction. This, coupled with the device and methods of the present disclosure, would allow a wind turbine system consisting of a concrete tower, nacelle, and rotor to be completely assembled without the use of a large crane and the associated costs.

In certain embodiments the present disclosure provides for a lifting system comprising an adjustable frame. In some forms, the frame comprises a quadrilateral form having four sides, for example a rectangle or a square. The frame may comprise alternative geometries, for example a hexagon, octagon, decagon, etc., such that the frame is expandable round various diameters of the tower. In some forms, the adjustable frame comprises a front frame member, a rear frame member, and two or more side frame members. In this way, the frame defines an interior portion through which the windmill tower is received. The frame is adjustable to allow the total area of the interior portion to expand/contract to accommodate various tower widths, and to maintain a secure attachment while ascending/descending a tower having a varying diameter. In accordance with some forms, devices of the present disclosure may comprise one or more actuators configured to extend or retract one or more of the frame members of the adjustable frame. The adjustable frame may incorporate any suitable actuator, for example: hydraulic actuators, electric actuators, and/or pneumatic actuators. In accordance with certain embodiments, the actuators comprise one or more hydraulic cylinders. In some forms, the actuator is positioned on a floating support member over a central portion of a frame member and comprises a first actuator arm that extends from the actuator and is secured to a first end portion of the frame member and a second actuator arm that extends from the actuator, opposite the first actuator arm, and is secured to a second end portion of the frame member, such that upon retraction/extension the end portions of the frame member are retracted/extended towards/from one another thus shortening/elongating the frame member.

In accordance with some forms, the lifting system comprises one or more booms secured on the adjustable frame. Certain embodiments comprise two parallel booms mounted on top of the frame and a telescoping and rotatable cross member connecting the top end of the booms to provide a suspension point for a hook block. In certain embodiments, the system further comprises a boom actuator, such as a hydraulic cylinder, attached to the boom and configured to position the cross member and hook block over the side and away from the tower to facilitate lifting one or more of the turbine components.

In certain embodiments, the lifting system comprises a telescoping boom cross member, configured to extend from shortened to elongate position. In this way the length of the boom crossmember can be lengthened in conjunction with the extension of the front member, rear member, and/or side members of the adjustable frame. In certain embodiments, the cross member is made up of several box members that fit inside one another. In accordance with some forms, the system comprises a cross member actuator, such as those described herein, configured to retract the cross member as the rig is raised to the top of the tower. The telescoping boom crossmember may incorporate any suitable actuator, for example: hydraulic actuators, electric actuators, and/or pneumatic actuators. Certain preferred embodiments comprise one or more hydraulic cylinders. In some forms, a block is suspended from a short section of a moveable support box member that can be adjusted with an actuator as described herein to center the hook block and load on the top of the tower. The cross member may comprise slewing bearings at the ends of the crossmember that allow it to be rotated as the main booms are raised and rotate to keep the hook block suspension point under the cross member.

In use, the boom(s) is (are) positioned to lift the nacelle assembly to the top of the tower and then the booms, cross member, hook block and nacelle assembly are rotated to position it on the center of the tower for mounting. In the same way a rotor assembly may be lifted and mounted to the turbine nacelle assembly. A frame hanging from the hook block can be used to mount individual blades. The booms and cross member can then be rotated further to clear the rear of the nacelle so that the rig can be lowered to the bottom of the tower with a 4-drum hoist system or strand jacks and then disassembled. The same 4-drum hoist system or strand jacks may be used to raise the rig to the top of the tower.

Lifting systems of the present disclosure may comprise a frame lifting hoist. For example, in some forms, the frame lifting hoist is positioned within the base of the tower. The frame lifting hoist may comprise a 4-drum lifting hoist having 4 lifting hoist cables extending therefrom. In some forms, the lifting system comprises one or more sheaves positioned near the top of the tower, such that a lifting hoist cable extends from the lifting hoist (e.g. 4-drum lifting hoist, or strand jack) up through the sheave near the top of the tower and is secured to the frame assembly.

Lifting systems of the present disclosure may further comprise a main hoist configured to raise or lower components of a wind turbine (e.g. wind turbine nacelle assembly, a rotor assembly, adapter, and/or individual turbine blades) In certain embodiments the main hoist may be mounted on a hoist frame. The hoist and/or the hoist frame may be secured on the ground at or near the base of the turbine tower. In some forms a main hoist cable extends from the main hoist to the hook block.

In certain embodiments, lifting systems of the present disclosure comprise one or more attachment brackets positioned near the top of the tower. In some forms, the attachment brackets are positioned below the sheaves. The attachment brackets may be bolted to the tower and are removable after completion of turbine installation. The concrete wall of the tower may be thickened and heavily reinforced at the bracket locations. In certain embodiments, the first, or upper, attachment brackets are configured to secure to a corresponding bracket positioned on the adjustable frame, and the second, or lower, attachment brackets are configured to attach to one or more bracing members extending from the bottom of the adjustable frame. In this way, the adjustable frame is secured in positioned near the top of the tower.

In certain instances, a frame with or without wheels may be used to safely elevate a load. For example, a light frame and wheels can be mounted to a nacelle to keep it from contacting the tower can be used in addition to or in lieu of a tie-back hoist line. In accordance with some forms, the adjustable frame may comprise one or more guide wheels positioned on an interior surface of the front member, rear member, and/or side member(s). Such guide wheels are positioned to contact and roll against the surface of the tower.

The disclosure provides a method of lifting a blade utilizing the system described herein. In some forms, the blade can be rotated from horizontal at ground level to vertical using pinned attachment points, one on each side of the bracket, and a tailing crane. All three blades can be installed sequentially in this manner. This is an alternate to assembling the rotor at ground level and reduces the required site area.

In some forms, the present disclosure provides a method for assembling wind turbine components on top of a pre-assembled turbine tower, such as a cast-in-place concrete turbine tower. In certain embodiments, the methods described herein include a step performed when manufacturing the tower, such as mounting one or more sheaves and/or attachment brackets near the top of the tower. In some forms, such methods comprise assembling an adjustable frame as disclosed herein around the base of the tower. In certain embodiments, the method comprises attaching a lift hoist cable to the assembled frame. The adjustable frame may then be lifted up the tower using a lift hoist connected to the lift hoist cable. In certain embodiments the adjustable frame and/or telescoping crossmember are retracted as the frame ascends the tower, for example when the diameter of the tower decreases moving up the tower. In accordance with some forms, the method comprises securing the adjustable frame to the tower. Such securing may include attaching one or more brackets on the adjustable frame and/or bracing members to attachment brackets positioned on the tower. In accordance with some forms, the boom is positioned in a flat position, laying generally parallel to the top surface of the adjustable frame, when the frame is being raised and/or lowered. In certain embodiments the boom is rotated into a lifting position. In accordance with some forms, the boom is configured to rotate about 180, preferably about 160 degrees, more preferably about 135 degrees and may extend from any side of the adjustable frame, preferably either the front or rear of the adjustable frame. Certain methods as disclosed herein comprise lowering the main hoist cable, optionally including a hoist block connected to the main hoist cable. A component of the turbine assembly (e.g. wind turbine nacelle assembly, a rotor assembly, adapter, and/or individual turbine blades) may then be attached to the main hoist cable and lifted. In accordance with some methods, the boom is rotated so as to position the lifted component for installation (e.g. over the tower or in front of the nacelle assembly), and the component is attached to the turbine assembly. Once all components have been installed the boom may be rotated away from the blades, for example towards the rear of the adjustable frame so as to avoid contacting the installed blades. In some forms, the adjustable frame is detached from the tower, and lowered to the base of the tower. In certain embodiments, the lift hoist cable is detached and the adjustable frame is disassembled.

Methods of the present disclosure may also include construction of a cast-in-place concrete turbine tower using a self-climbing formwork. Such methods may be used in conjunction with the methods for assembling wind turbine components on top of a pre-assembled turbine tower, as described herein. As used herein the term, "self-climbing formwork" refers to a specialized method of concrete tower construction utilizing formwork into which concrete is poured that climbs vertically up the structure being constructed. Examples of self-climbing framework techniques include jump-form and slip-form construction. The power for the climbing operation may be provided in a variety of ways, for example by hydraulic rams or electric motors connected to climbing feet. In accordance with some forms, the self-assembled concrete turbine tower is constructed utilizing a jump-form technique in which the formwork is progressed to the next section only after the concrete in the previous section has achieved the necessary strength. In such techniques, the methods may comprise: forming a first portion of the turbine tower (e.g. assembling forms, pouring and curing concrete, and/or disassembling forms), forming a second portion of the turbine tower, the second portion supported by the first portion, forming a third portion of the turbine tower, the third portion supported by the second portion, and so on until the desired height is reached. In this way, a jump-form technique climbs in steps following each subsequent concrete pour. Jump-form techniques are particularly advantageous because in addition to eliminating the need for a large crane, they also eliminate the need for 24-hour work and continuous pouring. Slip-form techniques utilize an assembly which slowly and continuously climbs during the concrete pour, which allows for smooth and continuous structure.

In use, the lifting systems of the present disclosure are secured to the turbine tower. Such a configuration is advantageous as the lifting system will sway with the natural movement of the tower. Prior systems, utilizing a crane or other separate lifting mechanism, create installation hazards as the system moves independent of the natural movement or sway of the tower. For example, a free-standing crane will sway with the wind and other forces at a different rate than the tower causing a hazard to installers and equipment. The system disclosed herein advantageously allows the installation of the nacelle and rotor without the need for a large crane. The system disclosed herein allows for installation of the nacelle and rotor in higher winds than a large crane that reaches the top of the tower, because the crane would have lower maximum wind limits due to overturning of the crane. The system of the present disclosure facilitates installation in higher winds by matching the movement of the nacelle and rotor being installed with the movement of the top of the tower.

Figure 2:
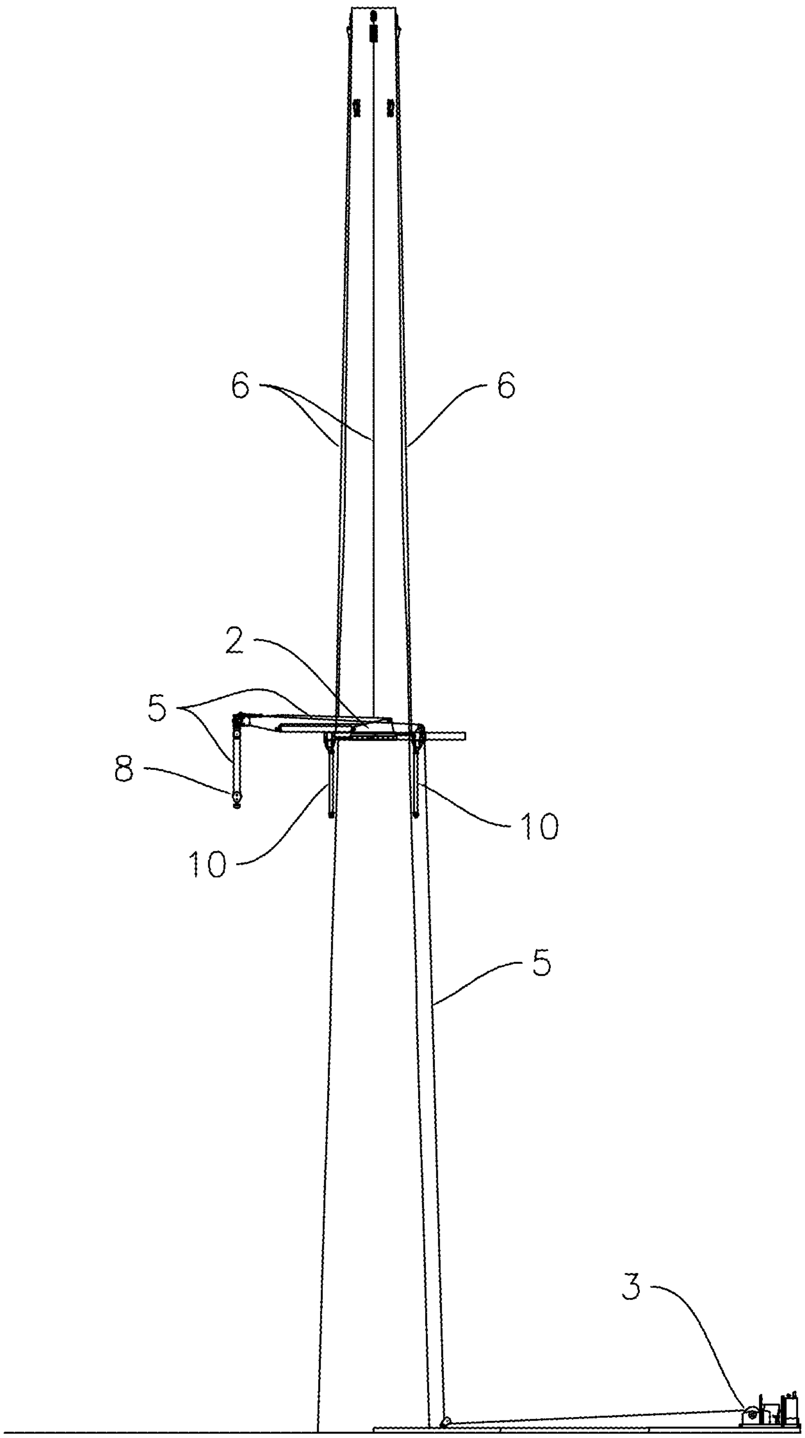
FIG. 2 provides a side view of one embodiment of a wind turbine lifting device of the present disclosure.
Figure 3:
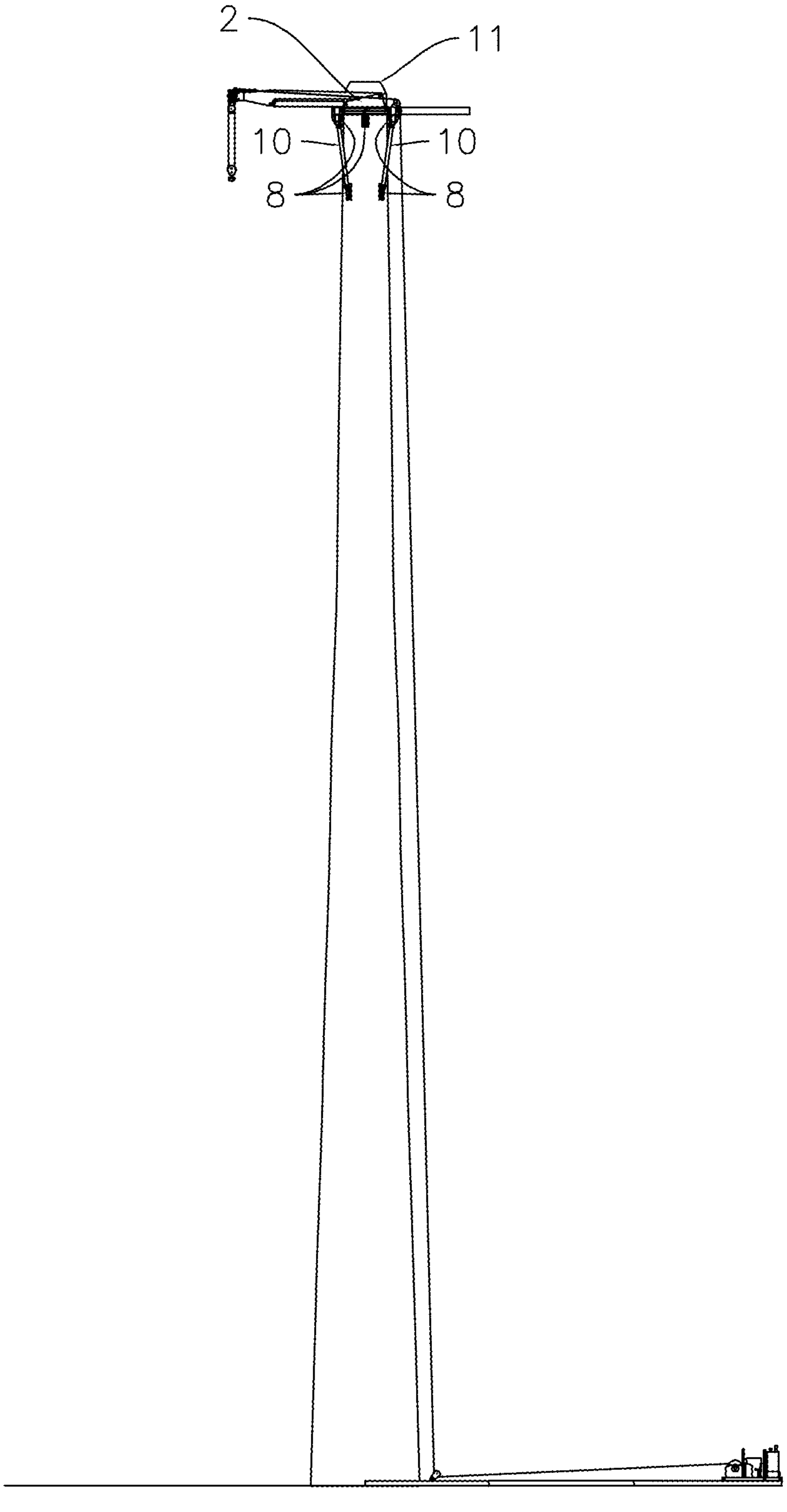
FIG. 3 provides a side view of one embodiment of a wind turbine lifting device of the present disclosure.

Turning now to a discussion of the embodiments shown in the figures, FIG. 1 is a concrete wind tower 1 with the lifting system adjustable frame 2 assembled around its base, a main hoist 3, main hoist frame 4, main hoist cable 5, lifting hoist cables 6, lifting hoist sheaves 7, hook block 8 and attachment brackets 9. FIG. 2 illustrates one embodiment of a lifting system wherein the adjustable frame 2 is being raised to the top of the tower, main hoist 3, main hoist cable 5, hook block 8, rig lifting hoist cables 6, and bracing members 10. FIG. 3 shows one embodiment of the lifting system wherein the adjustable frame 2 is connected to the attachment brackets 8 at the top of the tower and the bracing members 10 connected to the attachment brackets. A steel adaptor 11 is shown installed on the top of the tower.

Figure 4:
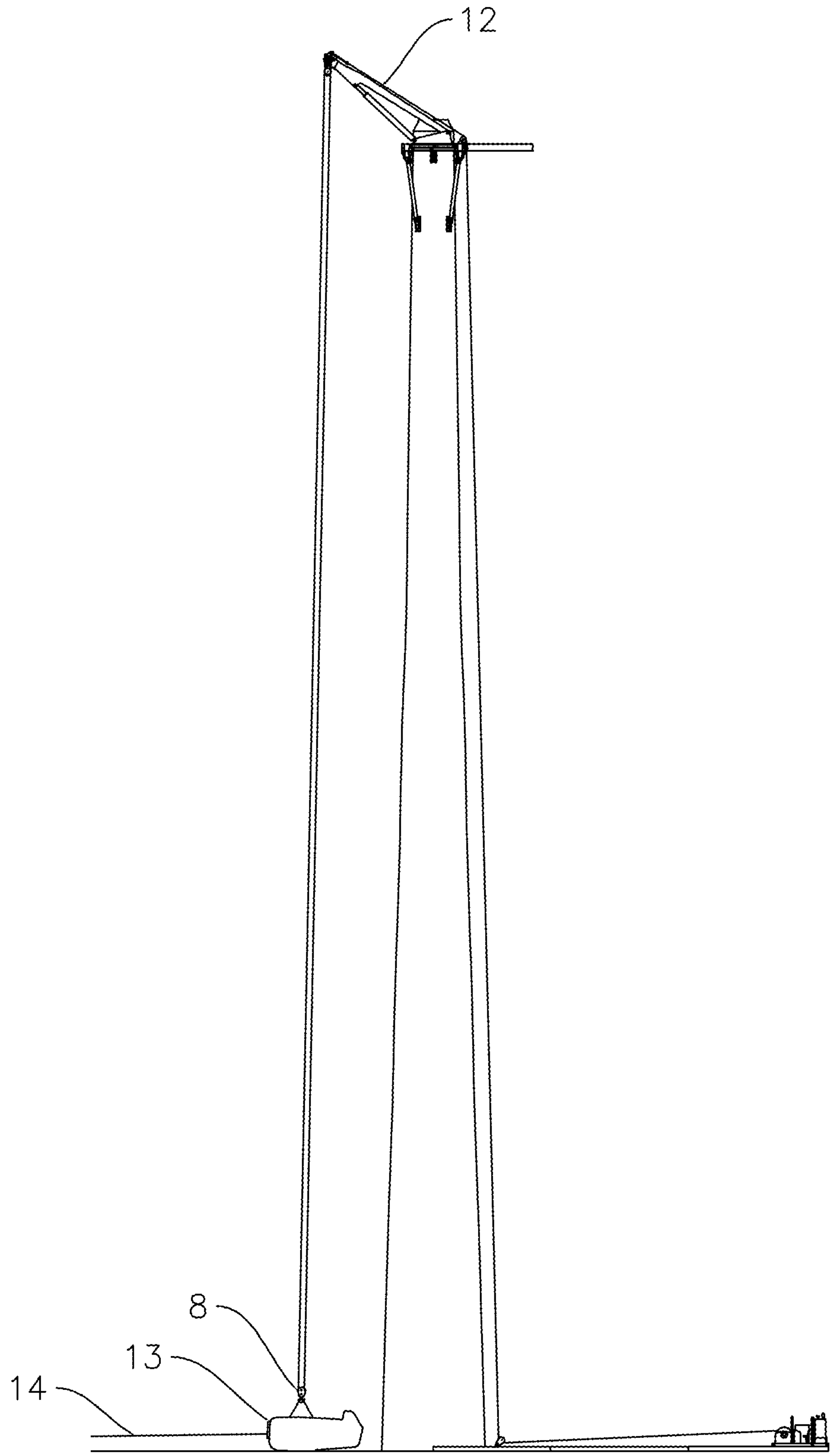
FIG. 4 provides a side view of one embodiment of a wind turbine lifting device of the present disclosure.
Figure 5:
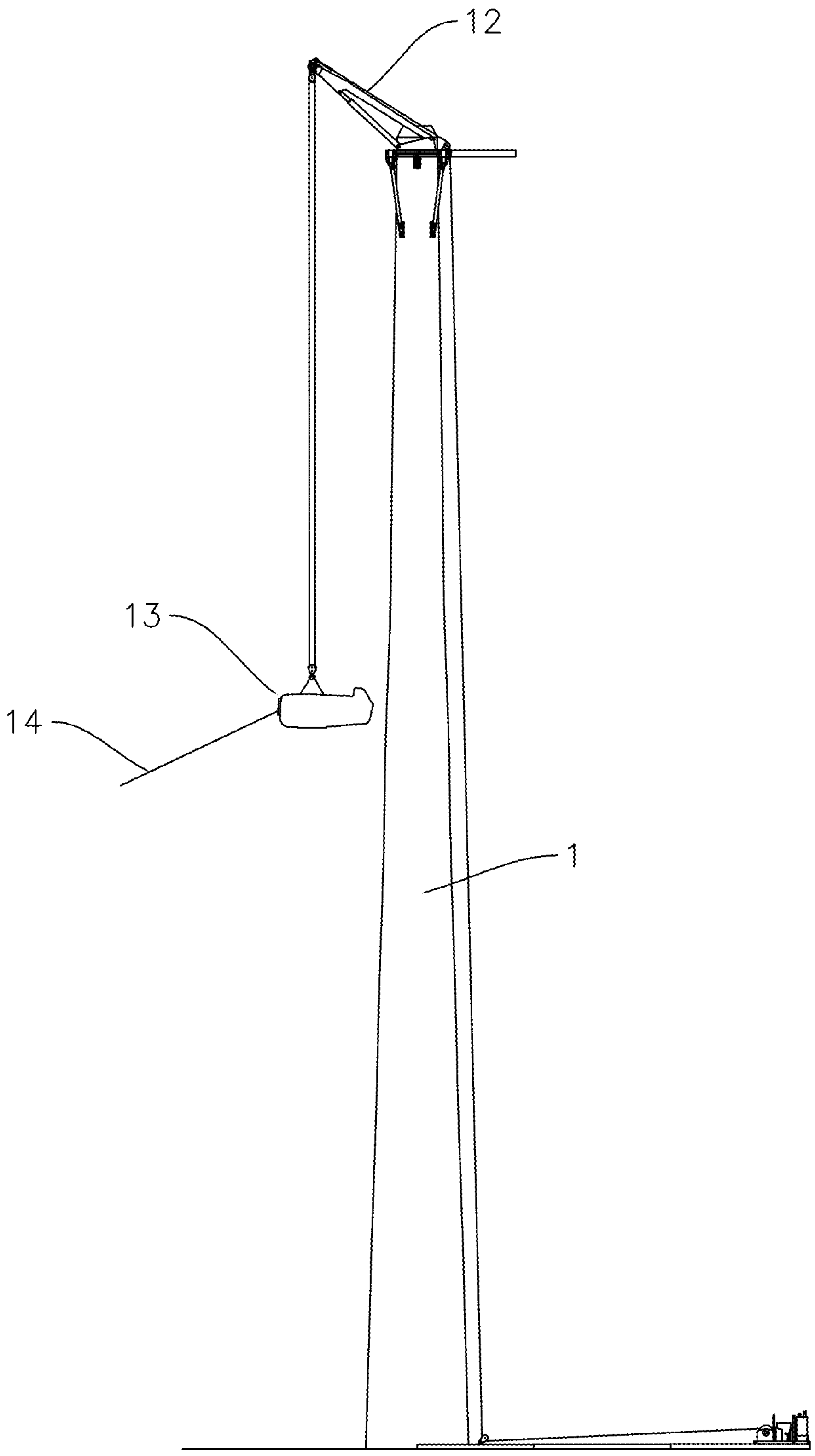
FIG. 5 provides a side view of one embodiment of a wind turbine lifting device of the present disclosure.
Figure 6:
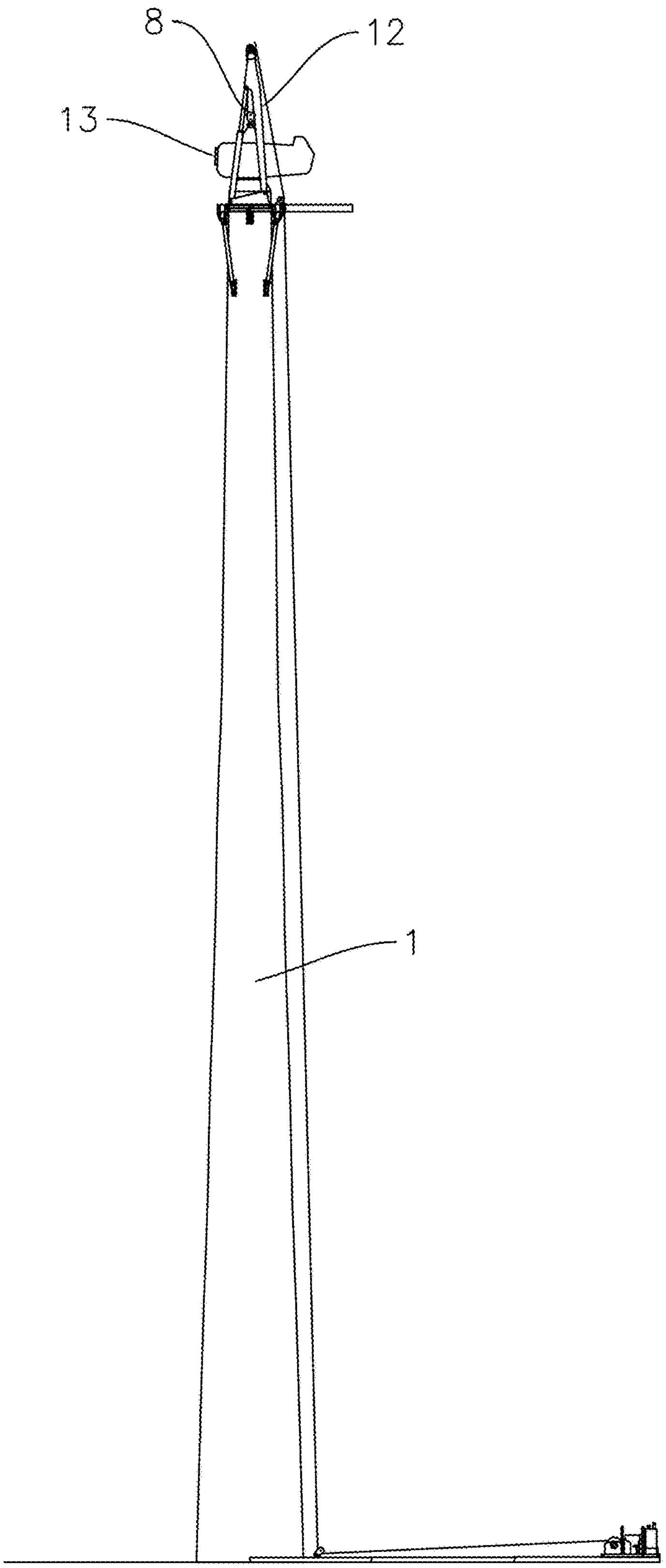
FIG. 6 provides a side view of one embodiment of a wind turbine lifting device of the present disclosure.
Figure 7:
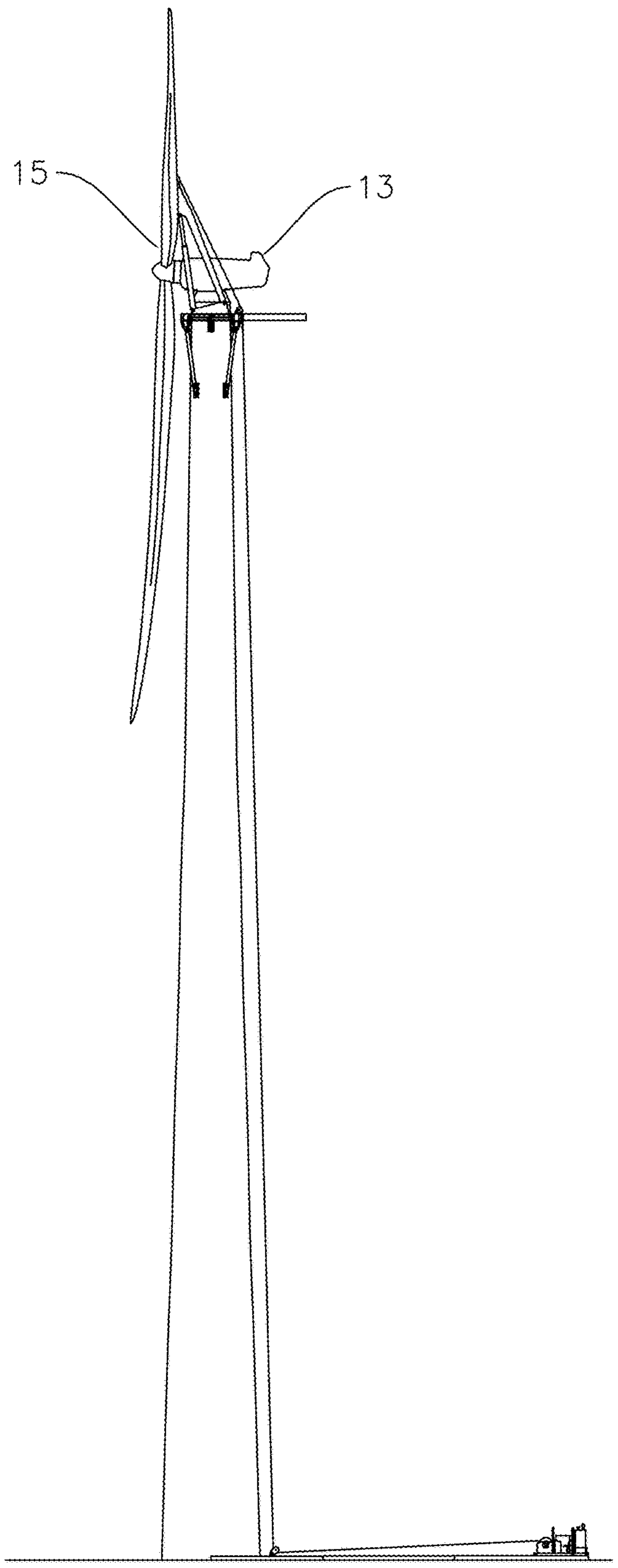
FIG. 7 provides a side view of one embodiment of a wind turbine lifting device of the present disclosure.

FIG. 4 shows one embodiment of a lifting system as disclosed herein, wherein the main booms 12 of the adjustable frame are rotated and the hook block 8 lowered and connected to the nacelle 13 and a tie-back hoist line 14. FIG. 5 shows one embodiment of a lifting system as disclosed herein wherein a nacelle 13 is being raised to the top of the tower 1 and a tie-back hoist line 14. FIG. 6 shows one embodiment of a lifting system as disclosed herein, wherein the nacelle 13 is being installed on the top of the tower 1 with the main booms 12 rotated so that the hook block 8 is centered over the top of the tower. FIG. 7 shows one embodiment of a lifting system as disclosed herein, wherein a rotor assembly 15 is being installed on the nacelle 13.

Figure 8:
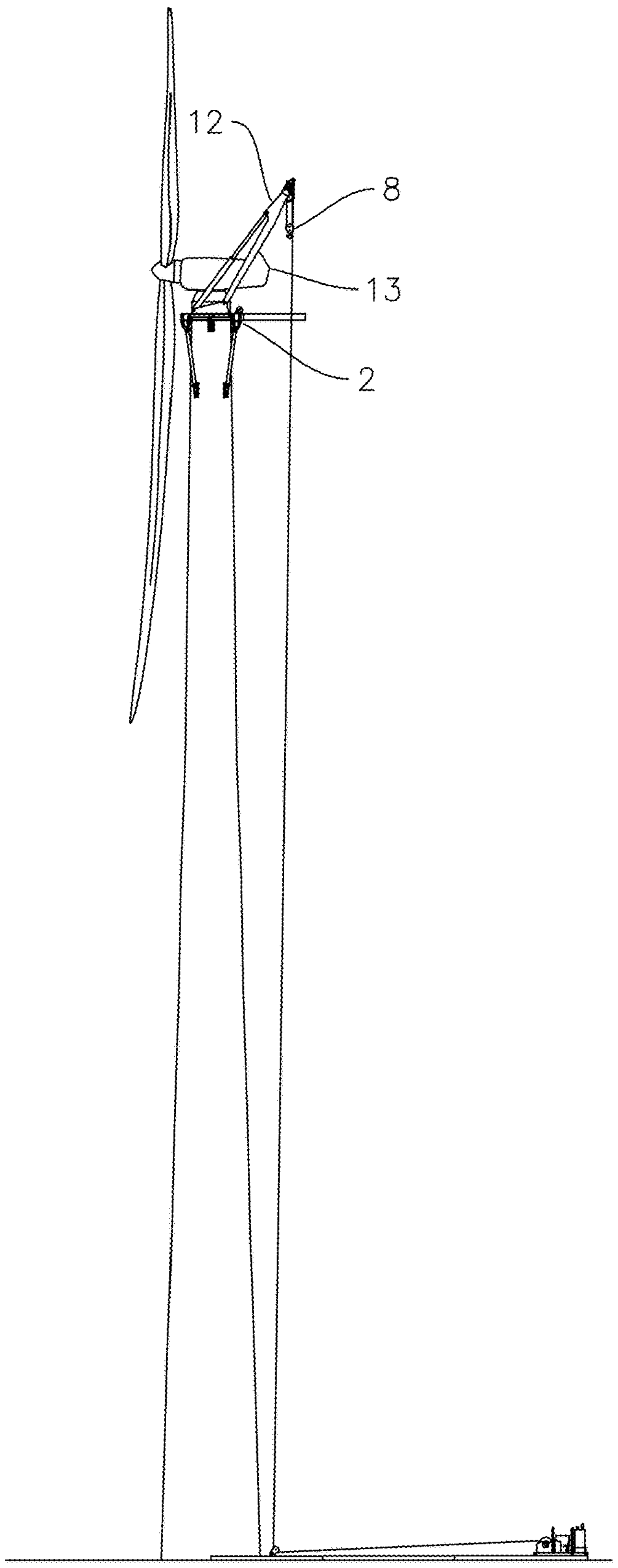
FIG. 8 provides a side view of one embodiment of a wind turbine lifting device of the present disclosure.
Figure 9:
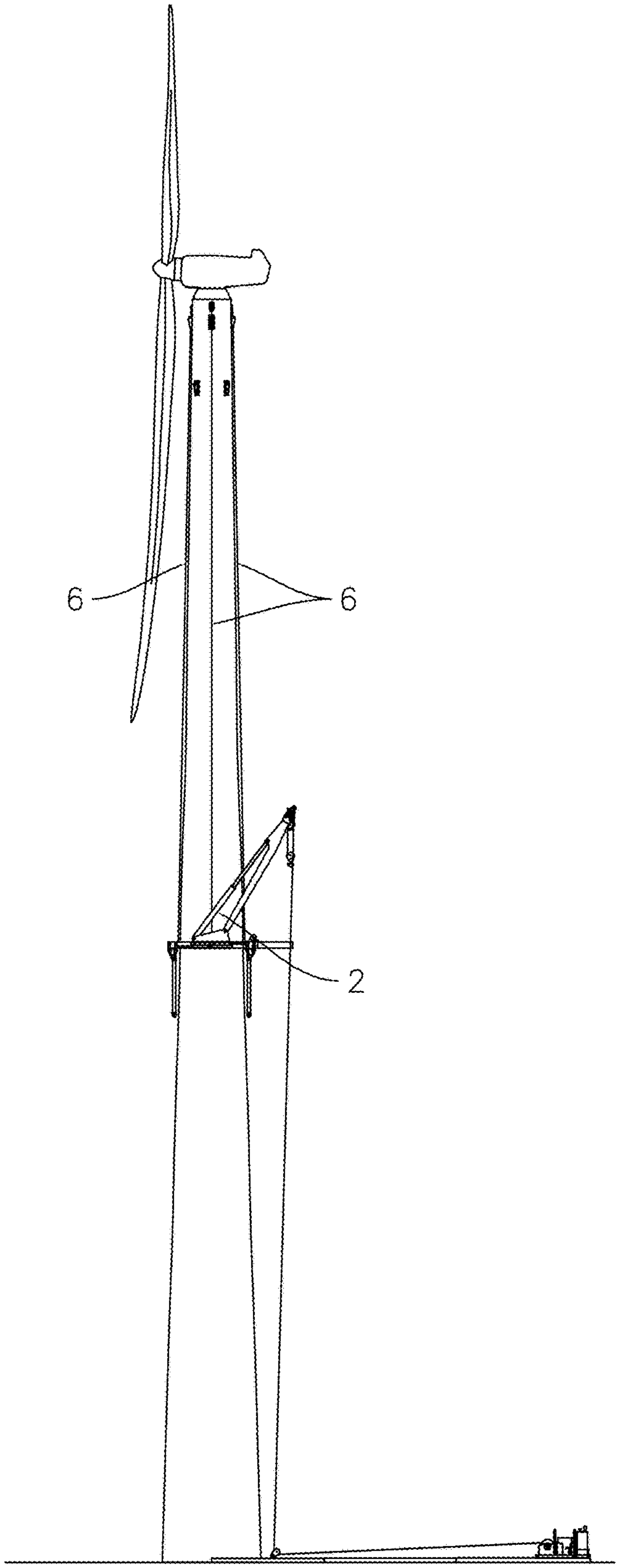
FIG. 9 provides a side view of one embodiment of a wind turbine lifting device of the present disclosure.

FIG. 8 shows one embodiment of a lifting system as disclosed herein, wherein the main booms 12 are rotated so that the hook block 8 clears the rear of the nacelle 13 and the lifting system rig 2 can be lowered to the base of the tower. FIG. 9 shows one embodiment of a lifting system as disclosed herein, wherein the adjustable frame 2 is being lowered to the base of the tower with the lifting hoist cables 6.

Figure 10:
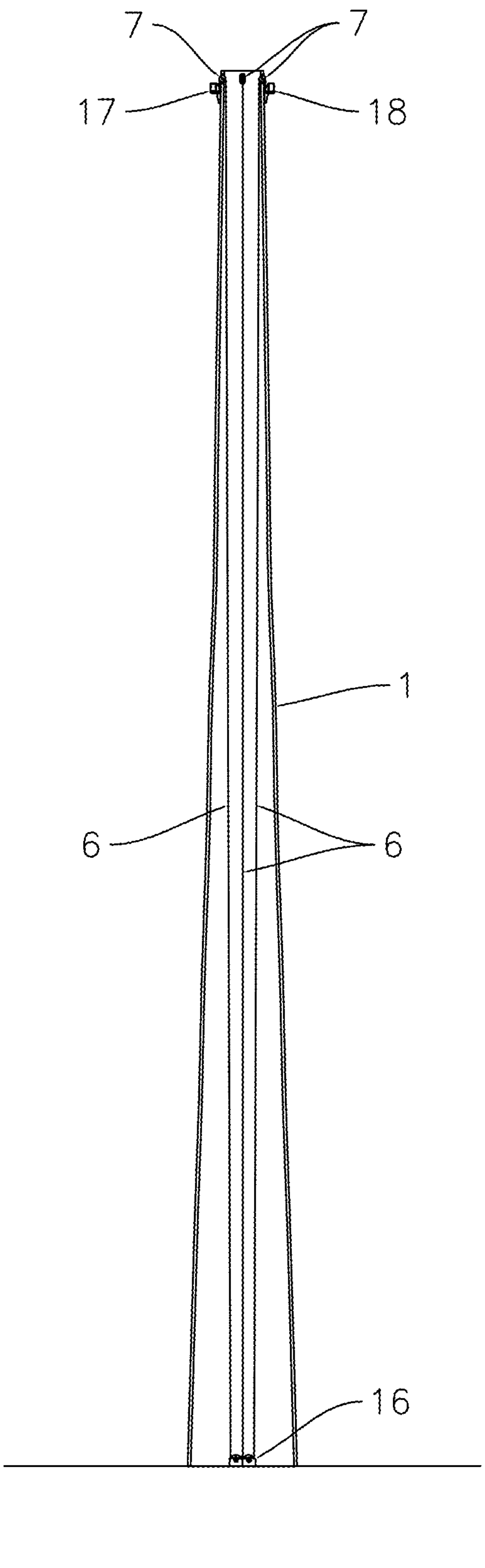
FIG. 10 provides a cross-sectional side view of one embodiment of a wind turbine lifting device of the present disclosure.

FIG. 10 is a cross section of one embodiment of a tower 1 showing the 4-drum lifting hoist 16 mounted inside the tower and the lifting hoist cables 6 inside the tower going up and over the lifting hoist sheaves 7 mounted in the wall at the top of the tower with the lifting hoist cables attached to the lifting system rig. A cross section of the rig front 17 and rear members 18 is shown.

Figure 11A:
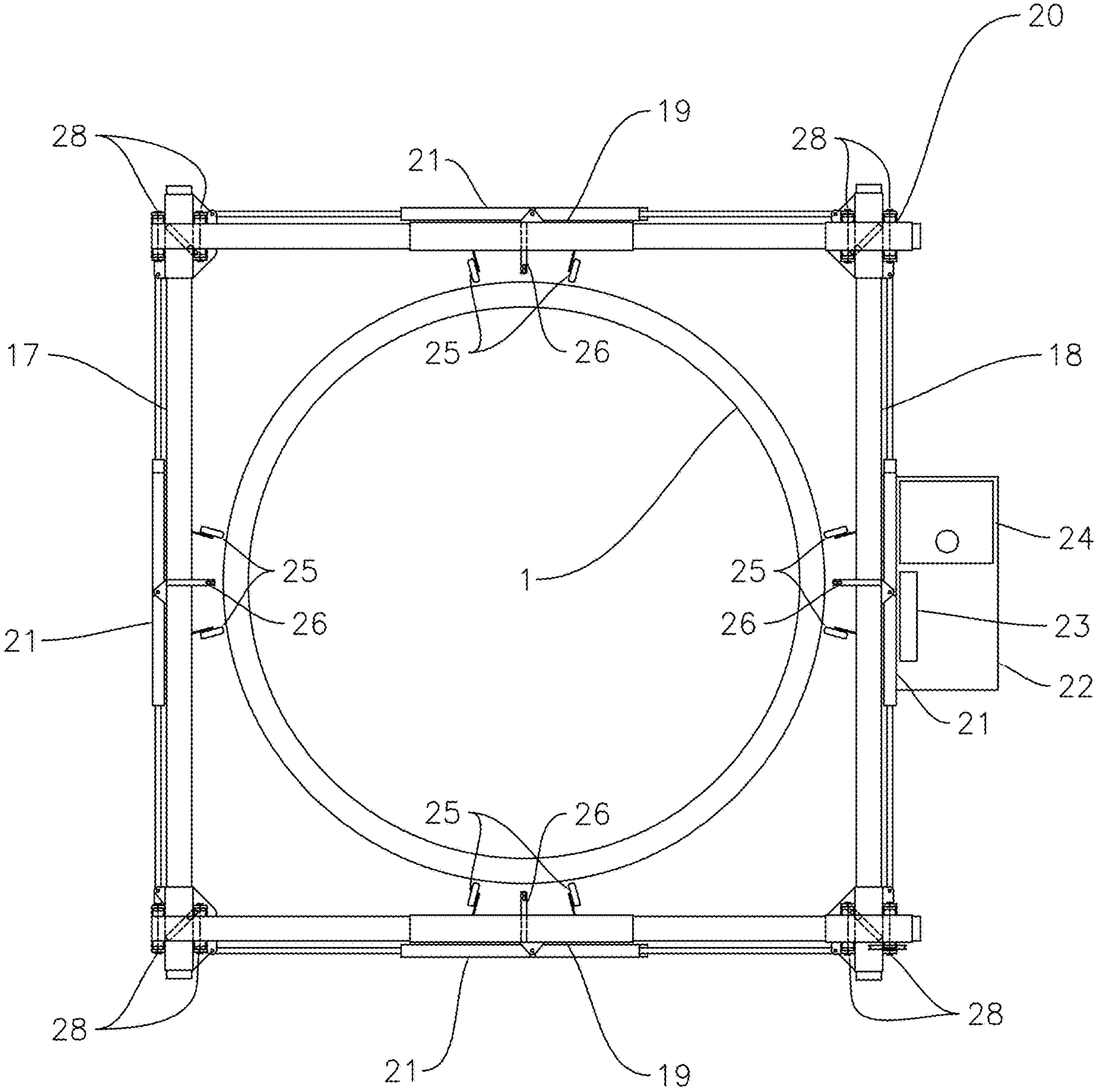
FIG. 11*a* provides a top down view of one embodiment of a wind turbine lifting device of the present disclosure. The rotatable boom is not shown for clarity.
Figure 11B:
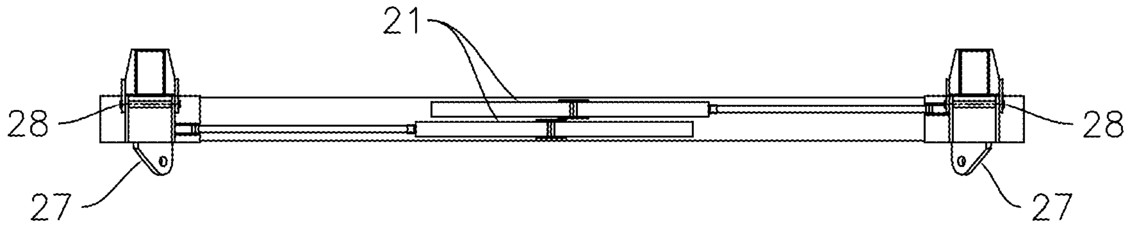
FIG. 11*b* provides a side view of one embodiment of a wind turbine lifting device of the present disclosure.
Figure 11C:
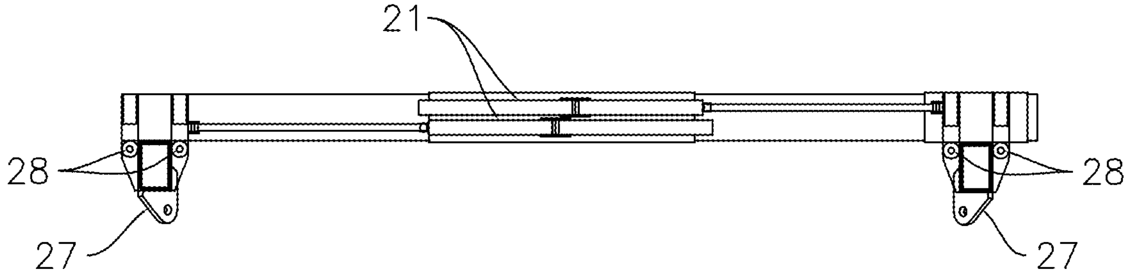
FIG. 11*c* provides a side view of one embodiment of a wind turbine lifting device of the present disclosure.

FIGS. 11*a*-11*c* show one embodiment of the adjustable frame 20 of the lifting system rig assembled at the base of the tower 1. FIG. 11*a* is a top-down view of adjustable frame 20 positioned on tower 1, tower 1 is shown in cross-section. The front member 17, rear member 18, and side members 19 are shown. FIG. 11*b* is a side view of side 19. FIG. 11*c* is a side view of front 17*a*. Main frame hydraulic cylinders 21 are shown which retract and reduce the inside dimensions of the main frame 20 as the lifting system rig is raised and the tower diameter decreases. A control platform 22, control panel 23, hydraulic reservoir 24, guide wheels 25, attachment bracket lugs 26, and bracing member lugs 27 are shown. Hydraulic reservoir 24 may comprise a reservoir and a pump. In the illustrated embodiment, the front rear and side members are connected with frame pins 28 when the main frame is assembled at the base of the tower.

Figure 12A:
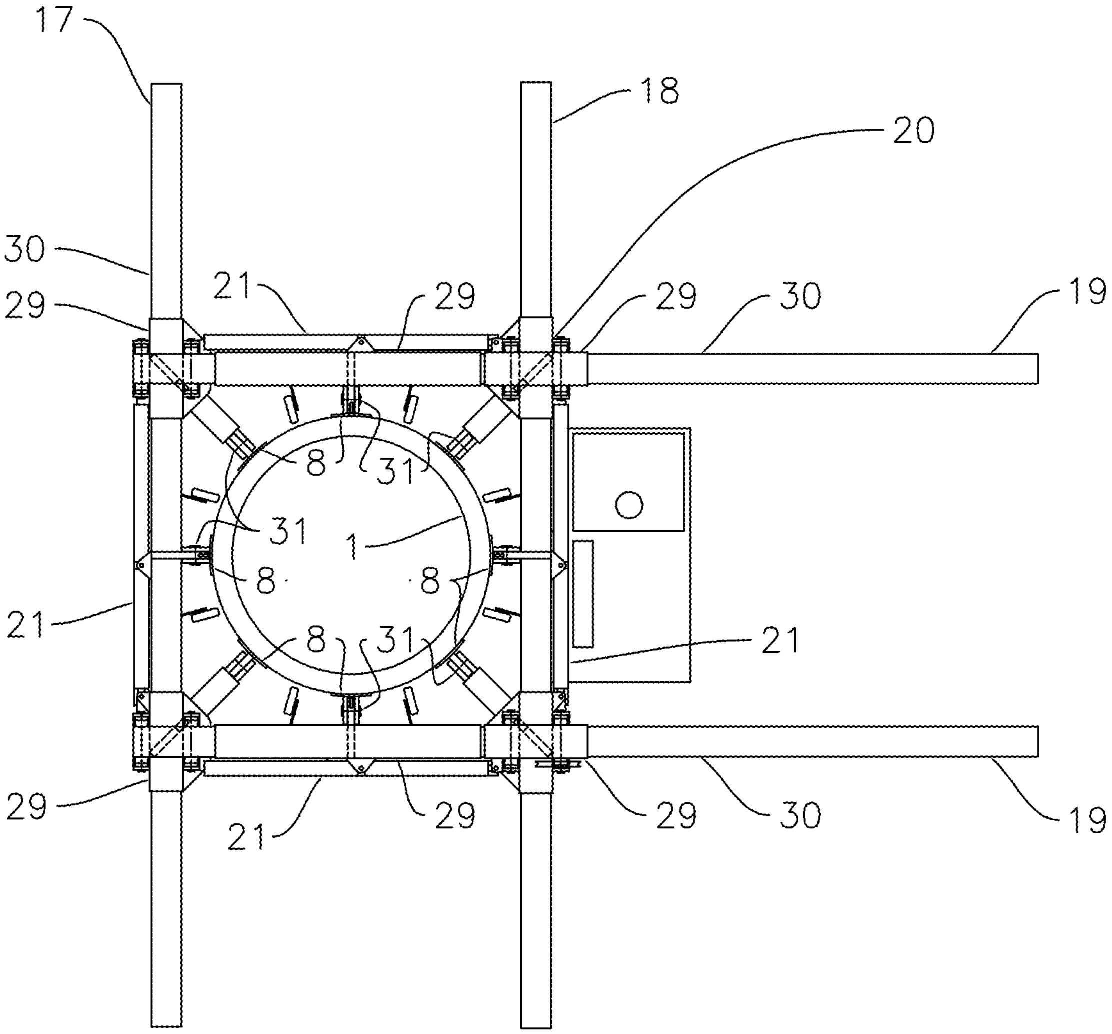
FIG. 12*a* provides a top down view of one embodiment of a wind turbine lifting device of the present disclosure. The rotatable boom is not shown for clarity.
Figure 12B:
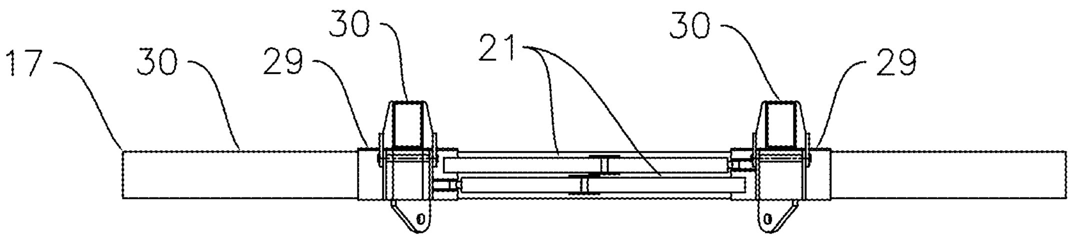
FIG. 12*b* provides a side view of one embodiment of a wind turbine lifting device of the present disclosure.
Figure 12C:
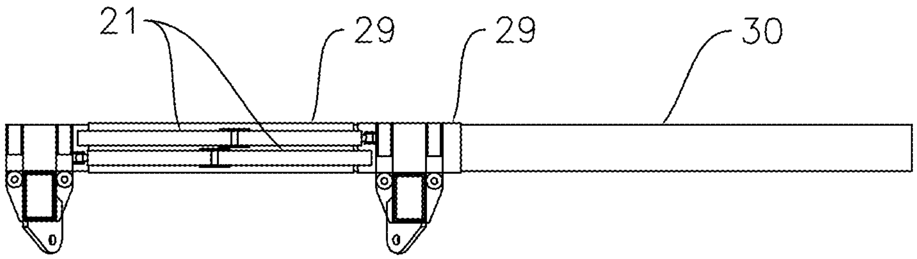
FIG. 12*c* provides a side view of one embodiment of a wind turbine lifting device of the present disclosure.

FIGS. 12*a*-12*c* show one embodiment of the adjustable frame 20 of the lifting system rig mounted at the top of the tower 1. FIG. 12*a* is a top-down view of adjustable frame 20 positioned on tower 1, tower 1 is shown in cross-section. FIG. 12*b* is a front view showing front side 17*a*. FIG. 12*c* is a side view showing side 19*a*. The hydraulic cylinders 21 are retracted. In the illustrated embodiment, the front 17 rear 18 and side members 19 consist of rectangular box members comprising outer box members 29 which slide on inner box members 30. In the illustrated embodiment, the main frame is connected to the tower attachment brackets 8 with attachment pins 31.

Figure 13A:
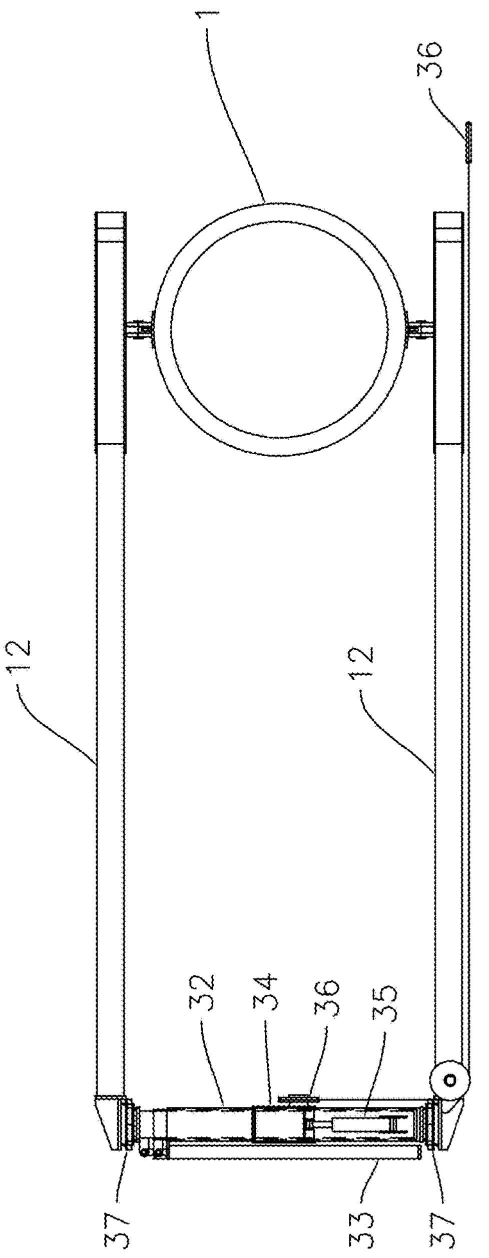
FIG. 13*a* provides a top down view of one embodiment of a wind turbine lifting device of the present disclosure. The adjustable frame is not shown for clarity.
Figure 13B:
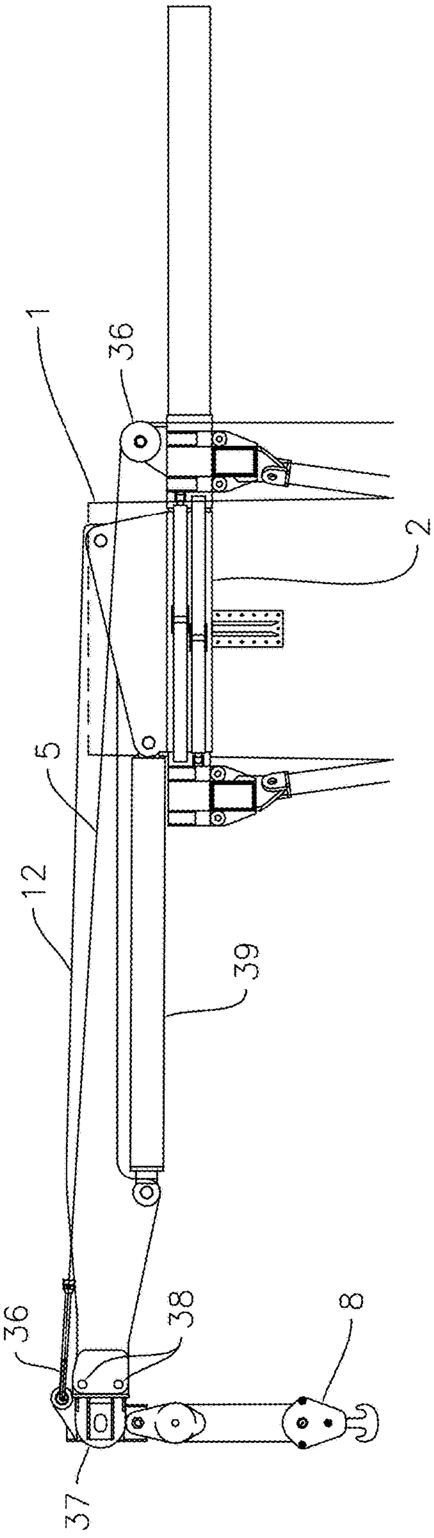
FIG. 13*b* provides a side view of one embodiment of a wind turbine lifting device of the present disclosure.
Figure 13C:
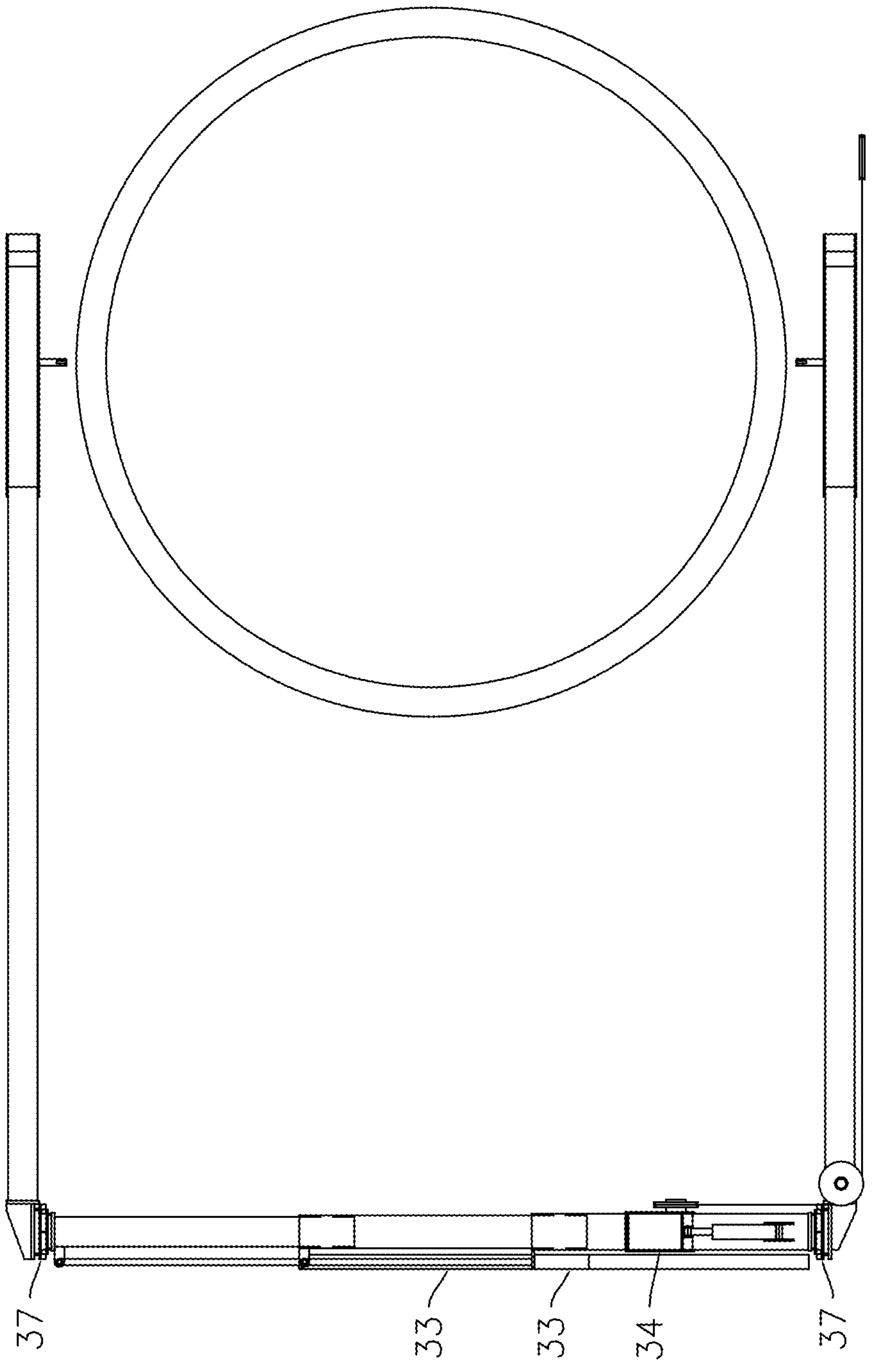
FIG. 13*c* provides a top down view of one embodiment of a wind turbine lifting device of the present disclosure. The adjustable frame is not shown for clarity.

FIGS. 13*a*-13*c* show one embodiment of the adjustable frame disclosed herein, in the illustrated embodiment the frame having two main booms 12 and telescoping cross member 32 is positioned at the top of the tower 1. FIGS. 13*a* and 13*c* are shown in the top down views of the booms, the adjustable frame is not shown for clarity. In these views, tower 1 is shown in cross-section. FIG. 13*b* is a side view of the lifting system including adjustable frame 2 shown mounted to the top of the tower 1. A plan view of the telescoping cross member extended 32*a*, as it would be at the base of the tower, is shown. In the illustrated embodiment, the cross member is made up of several rectangular box members that fit inside one another. In this way, cross member hydraulic cylinders 33 are configured to retract the cross member as the rig is raised to the top of the tower. In the illustrated embodiment, the hook block 8 is suspended from a short section of larger rectangular box member 34 that can be adjusted with a hook bock hydraulic cylinder 35 to center the hook block and nacelle on the top of the tower. The main hoist cable 5 is shown in the illustrated embodiment, and routing sheaves 36. The cross member has slewing bearings 37 at the ends that allow it to be rotated as the main booms are raised and rotate to keep the hook block suspension point under the cross member. In the illustrated embodiment, the cross member is connected with cross member pins 38 to the main booms. The main booms are raised and rotate by means of large main boom hydraulic cylinders 39.

Figure 14:
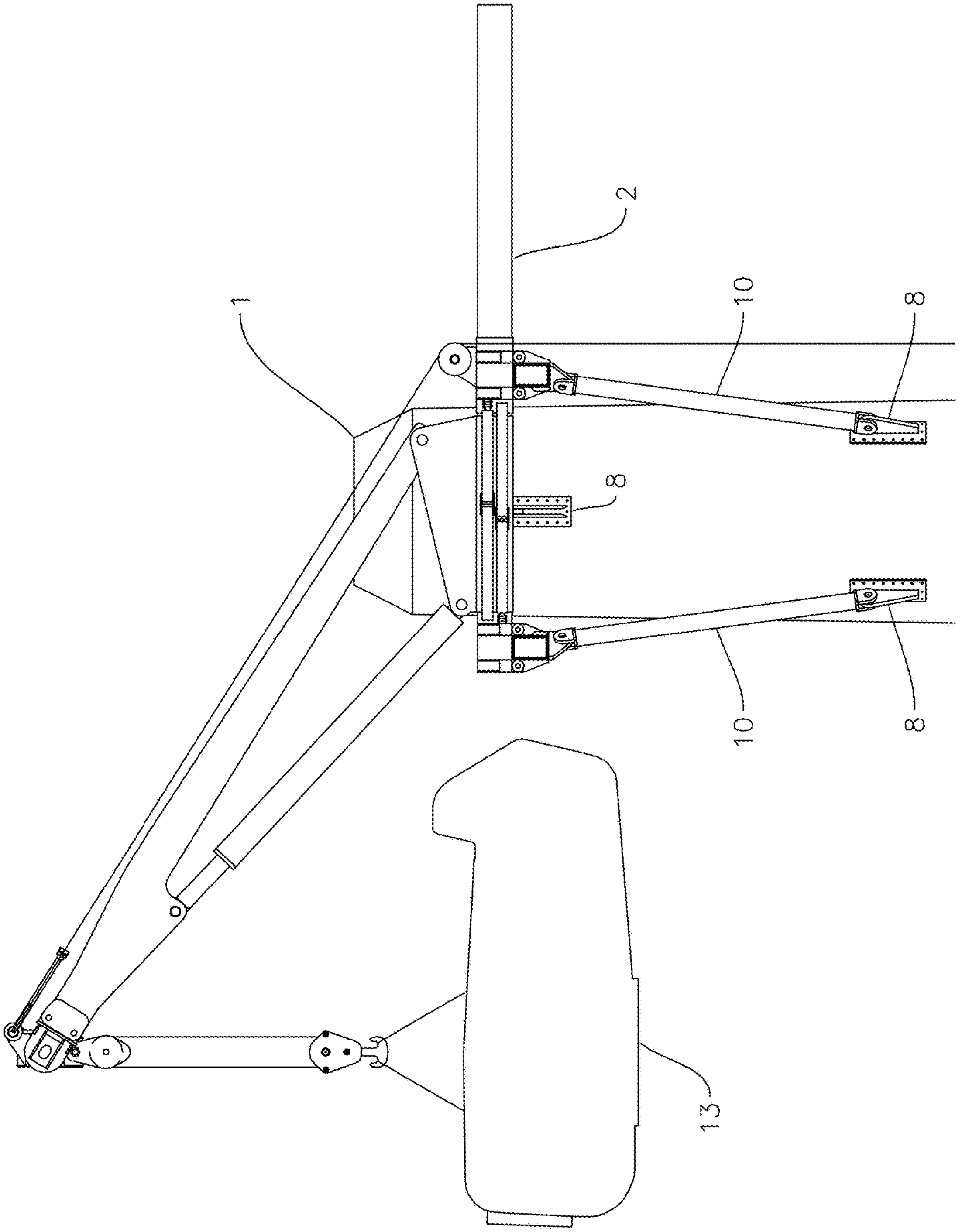
FIG. 14 provides a side view of one embodiment of a wind turbine lifting device of the present disclosure.

FIG. 14 shows an enlarged view of one embodiment of the lifting system rig 2 mounted to the attachment brackets 8 at the top of the tower and the bracing members 10 connected to the mounting brackets. The illustrated embodiment also shows the nacelle 13 near the top of the tower 1.

Figure 15:
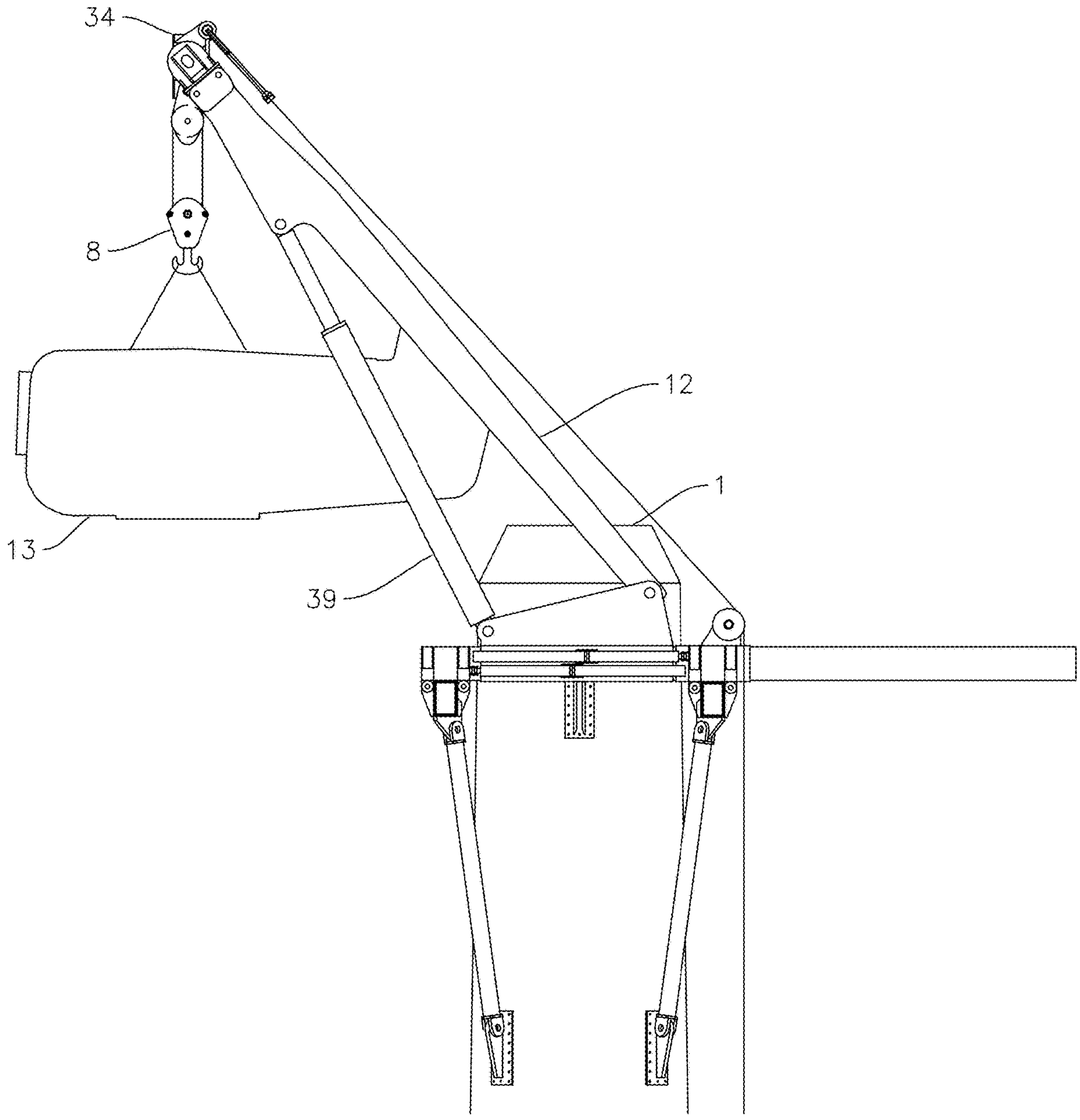
FIG. 15 provides a side view of one embodiment of a wind turbine lifting device of the present disclosure.
Figure 16:
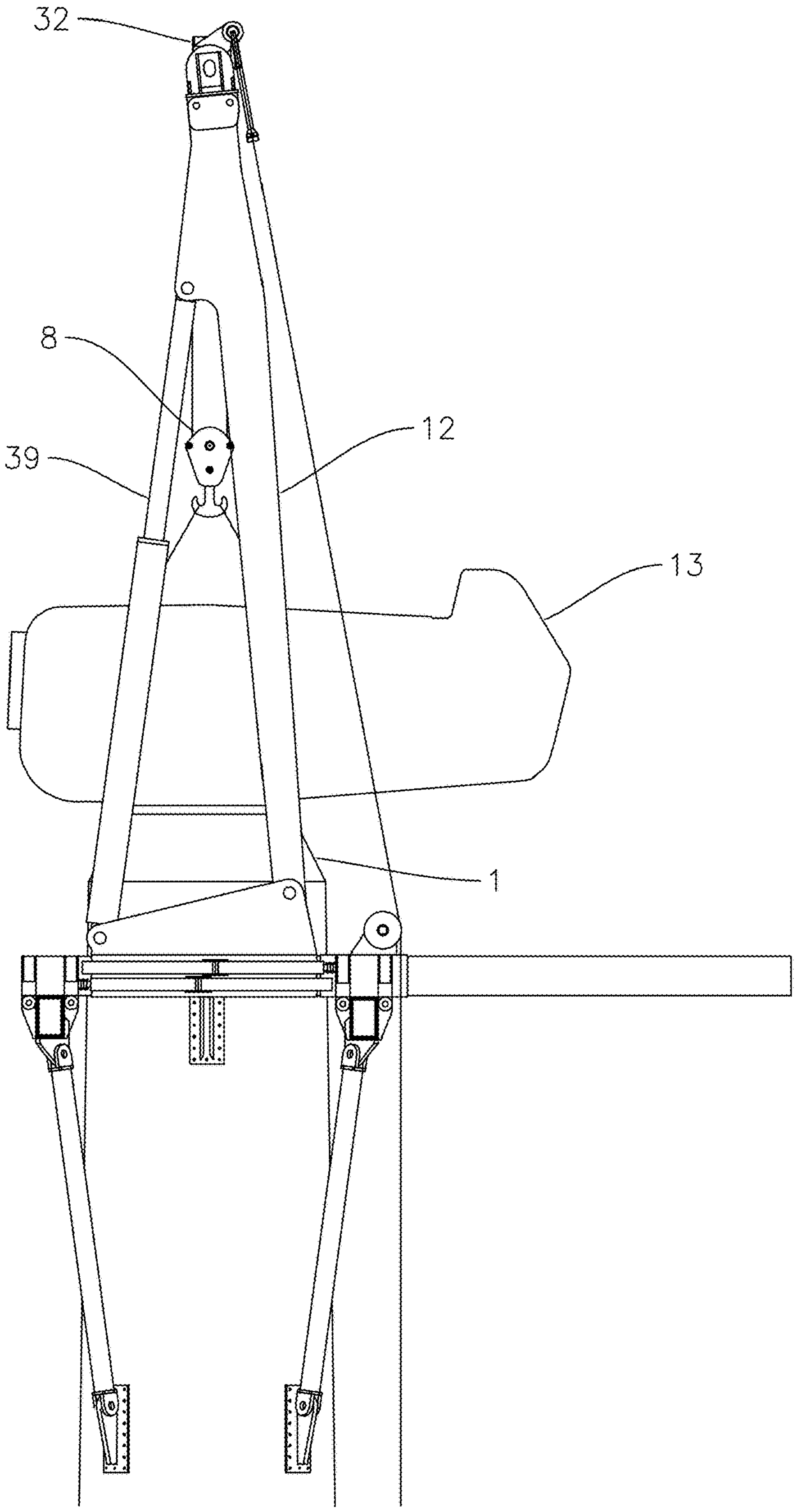
FIG. 16 provides a side view of one embodiment of a wind turbine lifting device of the present disclosure.
Figure 17:
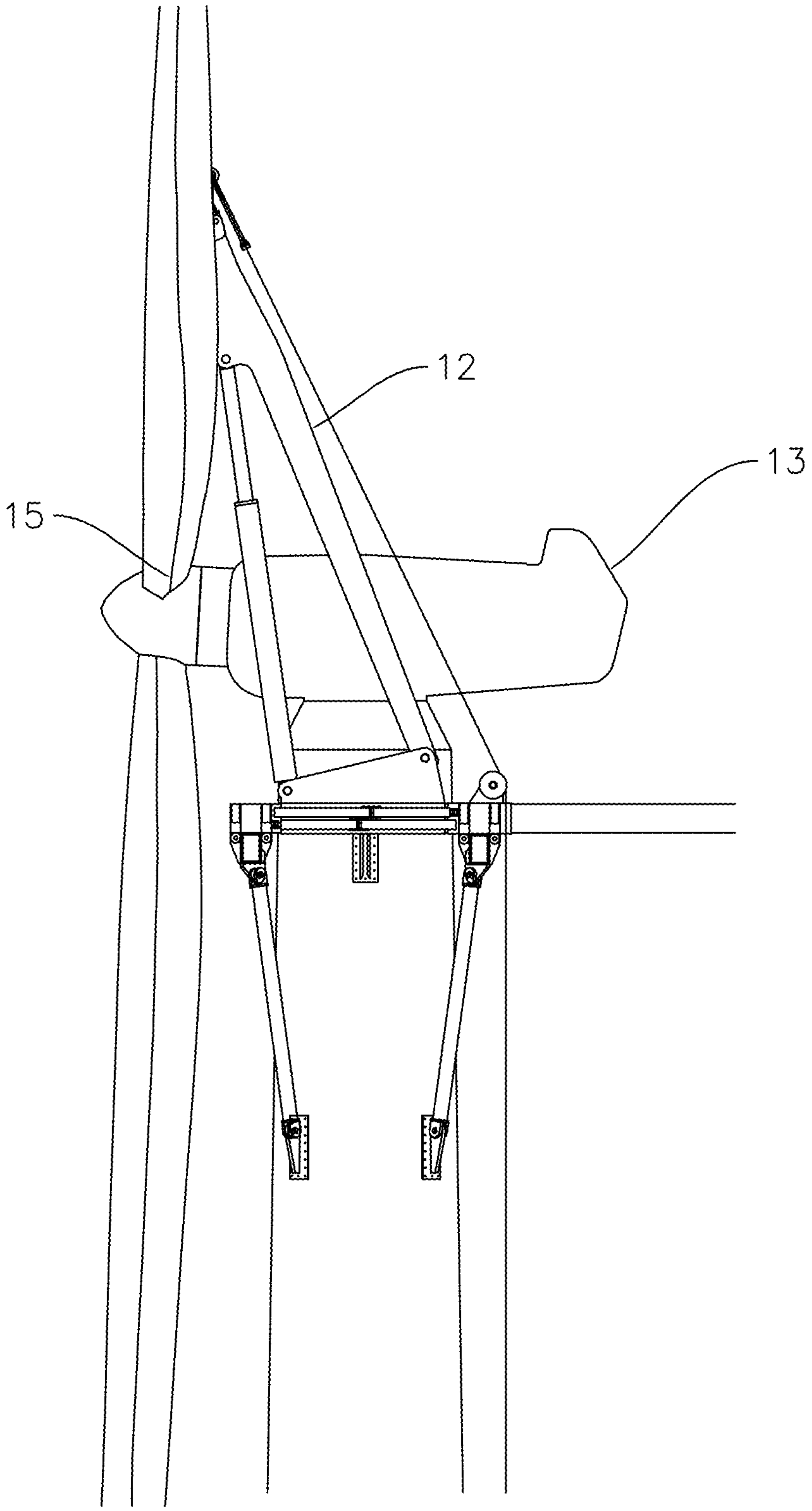
FIG. 17 provides a side view of one embodiment of a wind turbine lifting device of the present disclosure.
Figure 18:
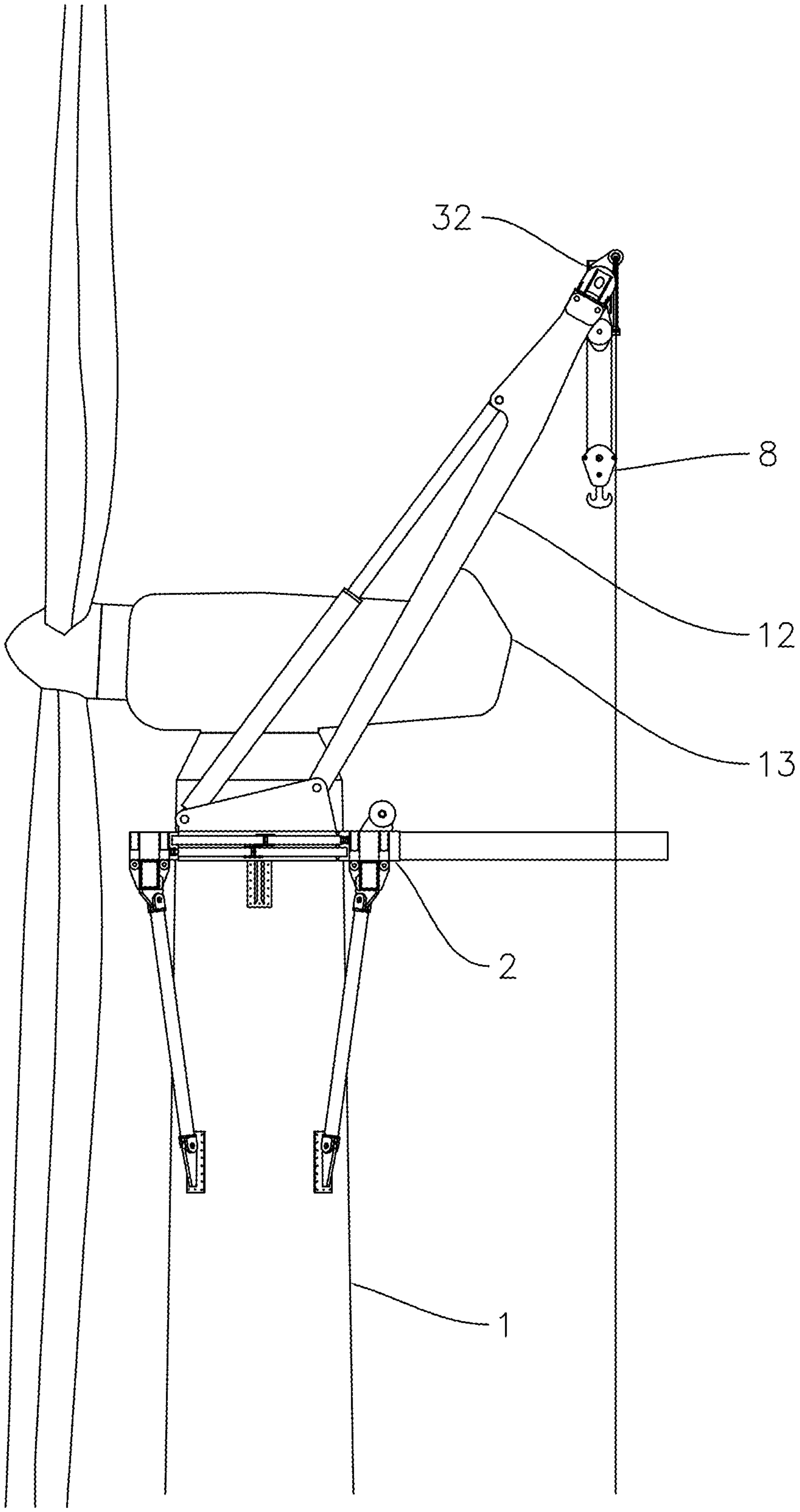
FIG. 18 provides a side view of one embodiment of a wind turbine lifting device of the present disclosure.

FIG. 15 shows one embodiment of a wind turbine lifting system, wherein the main booms 12 rotated by the main boom hydraulic cylinders 39 so that the cross member 34, hook block 8, and nacelle 13 are raised and brought towards the center of the tower 1. FIG. 16 shows one embodiment of a wind turbine lifting system wherein the main booms 12 are further rotated by the main boom hydraulic cylinders 39 so that the cross member 32, hook block 8, and nacelle 13 are brought over the center of the tower and the nacelle is mounted on the top of the tower 1. FIG. 17 shows one embodiment of a wind turbine lifting system, wherein the booms 12 and the rotor assembly 15 being installed on the front of the nacelle 13. FIG. 18 shows one embodiment of a wind turbine lifting system, wherein the booms 12 are further rotated so that the cross member 32 and hook block 8 clear the rear of the nacelle 13 and the adjustable frame 2 can be unmounted and lowered to the base of the tower 1.

Figure 19:
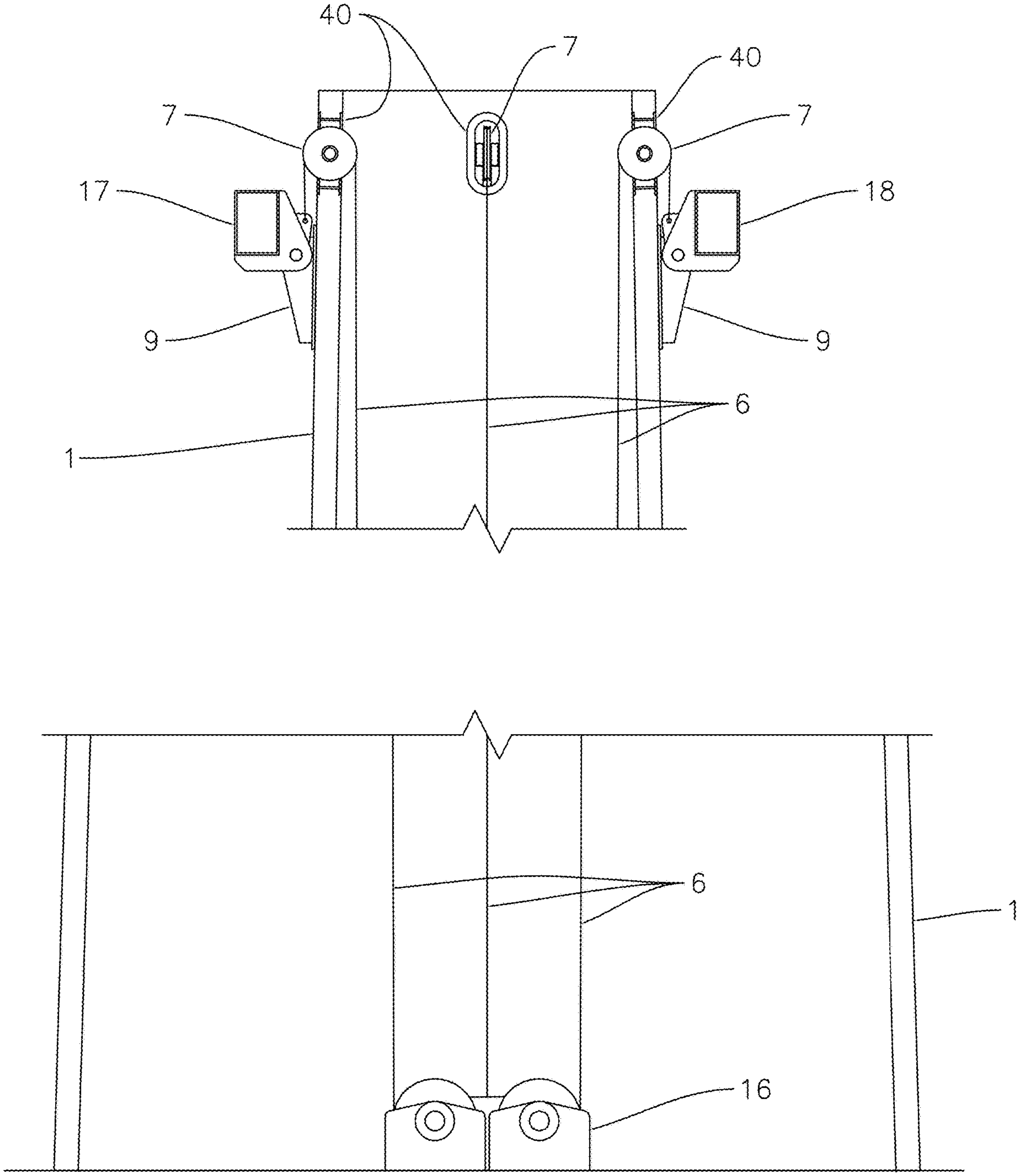
FIG. 19 provides a cross-sectional cutaway view of a wind turbine lifting device of the present disclosure.

FIG. 19 is an enlarged view of one embodiment of a wind turbine lifting system as disclosed herein, showing a cross section of the tower 1 at the base and at the top. The 4-drum lifting hoist 16 is shown and lifting hoist sheaves 7 mounted in the wall of the tower. The cables 6 are shown going up and over the hoist sheaves and attached to the front 17 and rear 18 lifting rig members. A cross section of the attachment brackets 9 is shown. The lifting hoist sheave frames 40 are shown which may be cast into the concrete wall.

Figure 20:
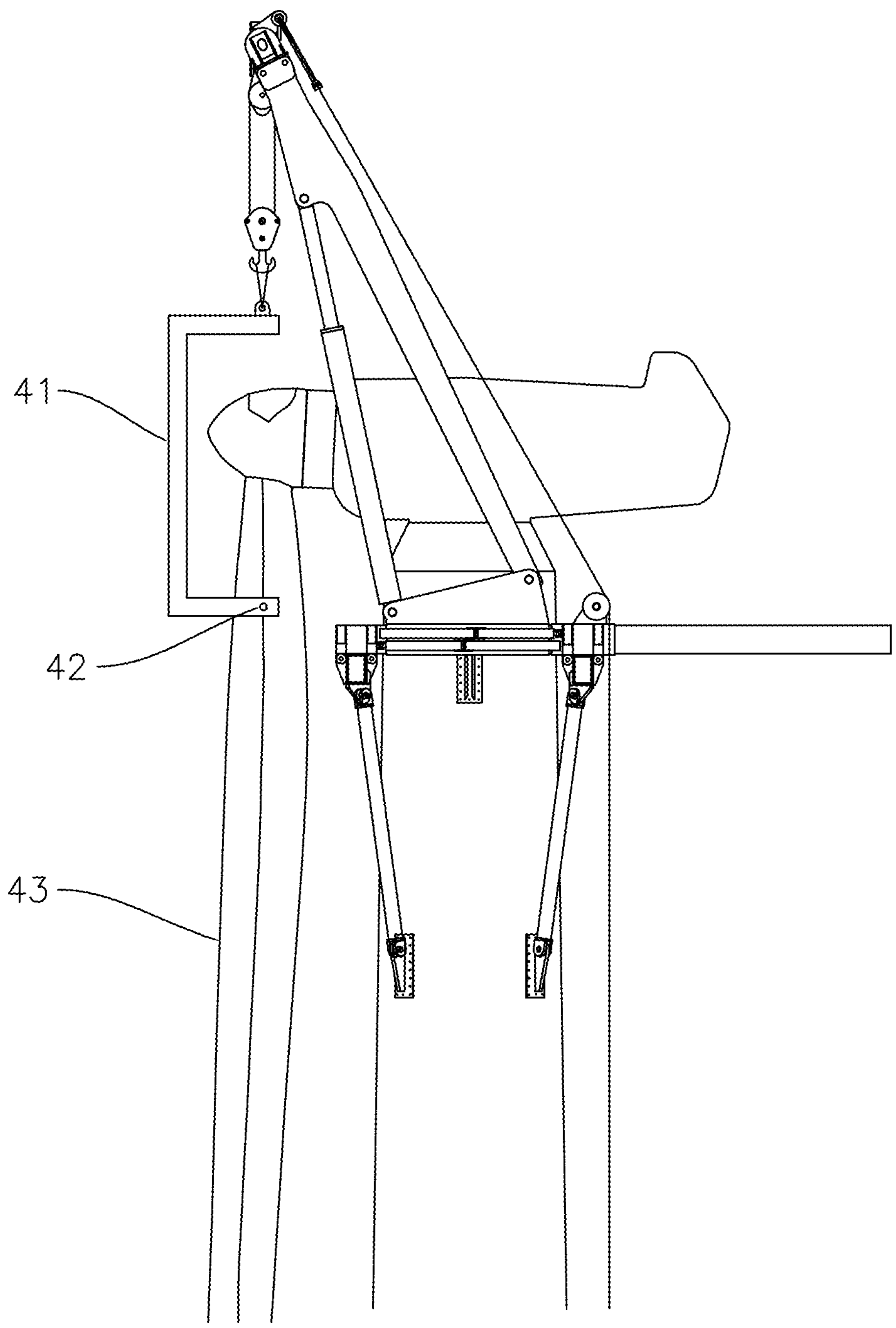
FIG. 20 provides a side view of one embodiment of a wind turbine lifting device of the present disclosure.

FIG. 20 shows one embodiment of a lifting system as disclosed herein. In the illustrated embodiment, a single blade 43 is being lifted and mounted using a bracket 41. The blade can be rotated from horizontal at ground level to vertical using pinned attachment points 42, one on each side of the bracket, and a tailing crane.

The following provides an enumerated listing of some of the embodiments disclosed herein. It will be understood that this listing is non-limiting, and that individual features or combinations of features (e.g. 2, 3 or 4 features) as described in the Detailed Description above can be incorporated with the below-listed Embodiments to provide additional disclosed embodiments herein.

1. A system for lifting and mounting components of a wind turbine assembly to the top of a wind turbine tower, the system comprising:
   - an adjustable frame defining an interior space sized to receive the tower, wherein the adjustable frame comprises one or more actuators configured to reduce or expand the interior space defined by the adjustable frame;
   - a first boom attached to the adjustable frame, the first boom rotatable with a first boom actuator; and
   - a second boom attached to the adjustable frame, the second boom rotatable with a second boom actuator, and wherein the first boom and the second boom are joined by a telescoping crossmember.
2. The system of embodiment 1, wherein the adjustable frame comprises a 4-sided frame body.
3. The system of embodiment 2, comprising an actuator positioned on each side of the 4-sided frame body and operable to extend or retract the length of the side.
4. The system of any one of the preceding embodiments, wherein the actuator comprises a hydraulic cylinder.
5. The system of any one of the preceding embodiments, wherein the first boom is parallel to the second boom.
6. The system of any one of the preceding embodiments, wherein the telescoping cross member provides a suspension point for a hook block.
7. The system of any one of the preceding embodiments, comprising a crossmember actuator configured to retract or extend the length of the crossmember.
8. The system of any one of the preceding embodiments, comprising one or more attachment brackets positionable near the top of the tower, wherein the attachment brackets are configured to secure the adjustable frame in position near the top of the tower.
9. The system of any one of the preceding embodiments, comprising one or more bracing members extending from a bottom side of the adjustable frame.
10. The system of embodiment 9, comprising one or more attachment brackets positioned on the tower and configured to attach to the bracing members to secure the adjustable frame in position near the top of the tower.
11. The system of any one of the preceding embodiments, comprising a lifting hoist and a lifting hoist cable configured to lift or lower the adjustable frame on the tower.
12. The system of embodiment 11, wherein the lifting hoist is positionable within the base of the tower.

13. The system of any one of embodiments 11 or 12, comprising one or more lifting hoist sheaves positionable in the wall near the top of the tower.
14. The system of embodiment 13, wherein the lifting hoist cable extends from the lifting hoist, through a lifting hoist sheave, and is secured to the adjustable frame.
15. The system of any one of the preceding embodiments, comprising a main hoist positionable near the base of the tower and a main hoist cable extending from the main hoist.
16. The system of embodiment 15, wherein the main hoist cable extends over the telescoping crossmember to a hook block.
17. The system of any one of embodiments 11-14, wherein the lifting hoist comprises a 4-drum lifting hoist.

The uses of the terms "a" and "an" and "the" and similar references herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the products or methods defined by the claims.

While embodiments of the disclosure have been illustrated and described in detail in the drawings and foregoing description, the same is to be considered as illustrative and not restrictive in character, it being understood that only some embodiments have been shown and described and that all changes and modifications that come within the spirit of the disclosures herein are desired to be protected.

What is claimed is:

1. A system for lifting and mounting components of a wind turbine assembly to the top of a wind turbine tower, the system comprising:
   - an adjustable frame defining an interior space sized to receive the tower, wherein the adjustable frame comprises one or more frame actuators configured to reduce or expand the interior space defined by the adjustable frame;
   - a first boom attached to the adjustable frame, the first boom rotatable with a first boom actuator; and
   - a second boom attached to the adjustable frame, the second boom rotatable with a second boom actuator, and wherein the first boom and the second boom are joined by a telescoping crossmember configured to expand and contract as the spacing between the first boom and the second boom changes with adjustment of the adjustable frame.

2. The system of claim 1, wherein the adjustable frame comprises a 4-sided frame body.

3. The system of claim 2, comprising one of the one or more frame actuators positioned on each side of the 4-sided frame body and operable to extend or retract the length of the side.

4. The system of claim 1, wherein the one or more frame actuators comprise a hydraulic cylinder.

5. The system of claim 1, wherein the first boom is parallel to the second boom.

6. The system of claim 1, wherein the telescoping cross member provides a suspension point for a hook block.

7. The system of claim 1, comprising a crossmember actuator configured to retract or extend the length of the crossmember.

8. The system of claim 1, comprising one or more attachment brackets positionable near the top of the tower, wherein the attachment brackets are configured to secure the adjustable frame in position near the top of the tower.

9. The system of claim 1, comprising one or more bracing members extending from a bottom side of the adjustable frame.

10. The system of claim 9, comprising one or more attachment brackets positionable on the tower and configured to attach to the bracing members to secure the adjustable frame in position near the top of the tower.

11. The system of claim 1, comprising a lifting hoist and a lifting hoist cable configured to lift or lower the adjustable frame on the tower.

12. The system of claim 11, wherein the lifting hoist is positionable within the base of the tower.

13. The system of claim 12, comprising one or more lifting hoist sheaves positionable in a wall near the top of the tower.

14. The system of claim 13, wherein the lifting hoist cable extends from the lifting hoist, through a lifting hoist sheave, and is secured to the adjustable frame.

15. The system of claim 11, comprising one or more lifting hoist sheaves positionable in a wall near the top of the tower.

16. The system of claim 15, wherein the lifting hoist cable extends from the lifting hoist, through a lifting hoist sheave, and is secured to the adjustable frame.

17. The system of claim 11, wherein the lifting hoist comprises a 4-drum lifting hoist.

18. The system of claim 1, comprising a main hoist positionable near the base of the tower and a main hoist cable extending from the main hoist.

19. The system of claim 18, wherein the main hoist cable extends over the telescoping crossmember to a hook block.

* * * * *